(12) United States Patent
Nemat-Nasser

(10) Patent No.: US 9,472,083 B2
(45) Date of Patent: *Oct. 18, 2016

(54) DIRECT OBSERVATION EVENT TRIGGERING OF DROWSINESS

(71) Applicant: Lytx, Inc., San Diego, CA (US)

(72) Inventor: Syrus C. Nemat-Nasser, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/581,712

(22) Filed: Dec. 23, 2014

(65) Prior Publication Data

US 2015/0137979 A1  May 21, 2015

Related U.S. Application Data

(63) Continuation of application No. 13/755,194, filed on Jan. 31, 2013, now Pat. No. 8,952,819.

(51) Int. Cl.
*G08B 23/00* (2006.01)
*G08B 21/06* (2006.01)
*B60K 28/06* (2006.01)

(52) U.S. Cl.
CPC ............ *G08B 21/06* (2013.01); *B60K 28/066* (2013.01)

(58) Field of Classification Search
CPC ...... G08B 21/06; B60K 28/066; A61B 5/18; A61B 5/082; A61B 5/02055; A61B 5/7275; A61B 5/746; B60W 2040/0827; B60W 2530/14; B60W 2540/24; B60W 2550/402; B60W 40/09; B60W 50/14
USPC ......... 340/575, 425.1, 576, 436, 937, 573.1, 340/539.12, 539.13, 571, 683, 691.3, 691.6, 340/692, 5.53
See application file for complete search history.

(56) References Cited

U.S. PATENT DOCUMENTS

| | | | | |
|---|---|---|---|---|
| 7,027,621 | B1* | 4/2006 | Prokoski | G06K 9/00255 180/272 |
| 8,952,819 | B2* | 2/2015 | Nemat-Nasser | B60K 28/066 340/425.1 |
| 2010/0202658 | A1* | 8/2010 | Ishida | A61B 5/18 382/103 |
| 2010/0214087 | A1* | 8/2010 | Nakagoshi | A61B 5/18 340/436 |
| 2010/0245093 | A1* | 9/2010 | Kobetski | A61B 5/18 340/576 |
| 2013/0162797 | A1* | 6/2013 | Bogner | G08B 21/06 348/78 |
| 2014/0139655 | A1* | 5/2014 | Mimar | G08B 21/0476 348/77 |

* cited by examiner

*Primary Examiner* — Daniel Previl
(74) *Attorney, Agent, or Firm* — Van Pelt, Yi & James LLP

(57) ABSTRACT

A system for event triggering comprises an interface and a processor. An interface configured to receive a face tracking data and receive a sensor data. The processor configured to determine a degree of drowsiness based at least in part on the face tracking data and the sensor data; in the event that the degree of drowsiness is greater than a first threshold, capture data; and in the event that the degree of drowsiness is greater than a second threshold, provide a warning.

20 Claims, 17 Drawing Sheets

DIRECT OBSERVATION EVENT TRIGGERING OF DROWSINESS

CROSS REFERENCE TO OTHER APPLICATIONS

This application is a continuation of co-pending U.S. patent application Ser. No. 13/755,194, entitled DIRECT OBSERVATION EVENT TRIGGERING OF DROWSINESS filed Jan. 31, 2013 which is incorporated herein by reference for all purposes.

BACKGROUND OF THE INVENTION

Modern vehicles (e.g., airplanes, boats, trains, cars, trucks, etc.) commonly include a vehicle event recorder in order to better understand the timeline of an anomalous event (e.g., an accident). A vehicle event recorder typically includes a set of sensors—for example, video recorders, audio recorders, accelerometers, gyroscopes, vehicle state sensors, GPS (global positioning system), etc.—that report data, which is used to determine the occurrence of an anomalous event, and which is stored for later review of the event. More advanced systems, in addition to detecting anomalous events, attempt to detect risky operator behavior—for example, behavior that is likely to lead to an anomalous event. Detecting such behavior from the raw sensor data can be very difficult.

BRIEF DESCRIPTION OF THE DRAWINGS

Various embodiments of the invention are disclosed in the following detailed description and the accompanying drawings.

DETAILED DESCRIPTION

Figure 1:
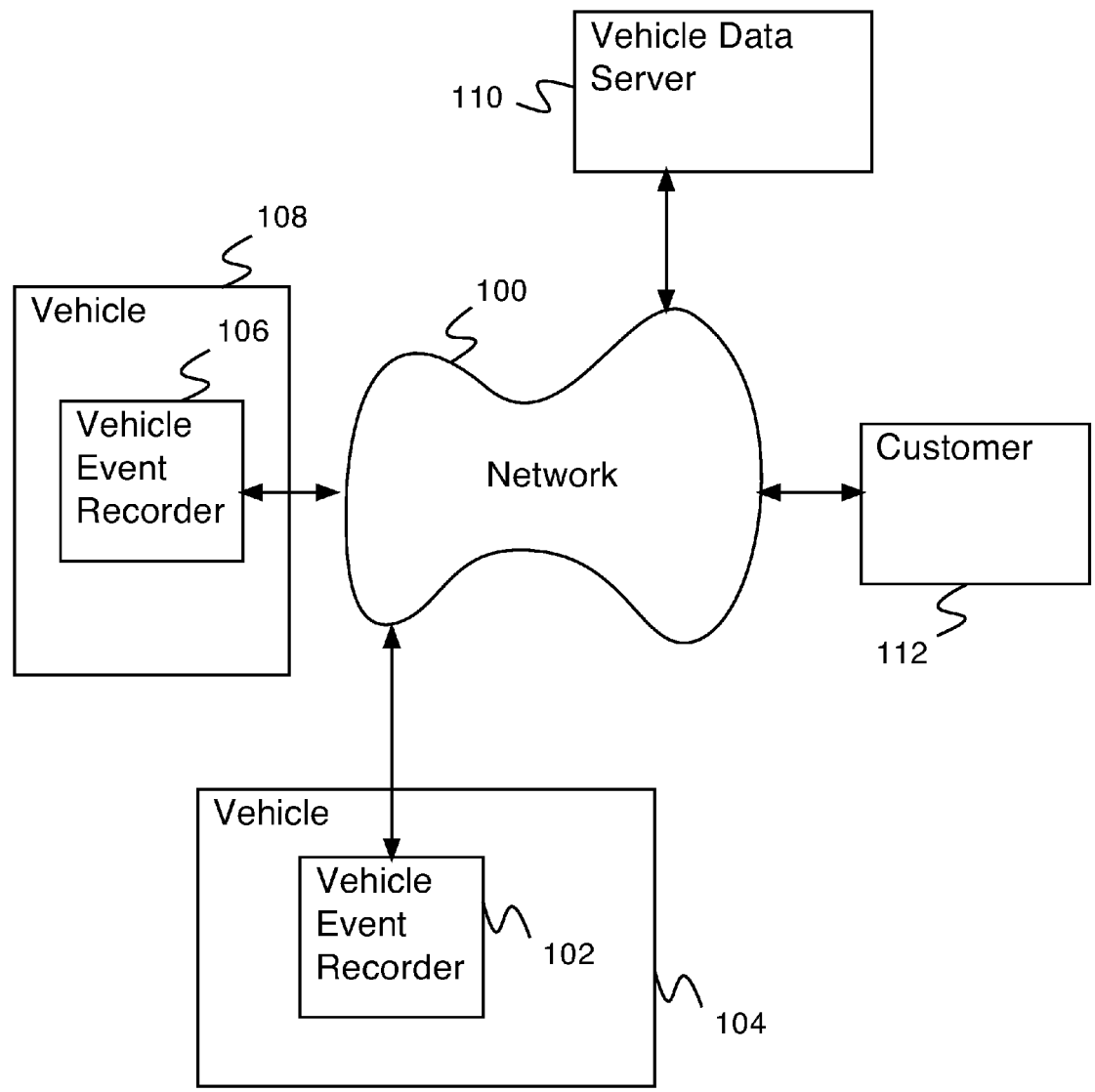
FIG. 1 is a block diagram illustrating an embodiment of a system for direct observation event triggering of drowsiness.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Direct observation event triggering of drowsiness is disclosed. A system for event triggering comprises an interface is configured to: receive face tracking data and receive sensor data. The system for event triggering comprises a processor configured to: determine a degree of drowsiness based at least in part on the face tracking data and the sensor data; and in the event that the degree of drowsiness is greater than a first threshold, capture data; in the event that the degree of drowsiness is greater than a second threshold, provide a warning. The system is further comprised of a memory coupled to the processor that is configured to provide the processor with instructions.

A vehicle event recorder mounted on a car or truck identifies anomalous events—for example, accidents—using sensor data. In addition, the vehicle event recorder detects risky operator behavior—for example, behavior likely to lead to anomalous events. Risky operator behavior is detected using a combination of vehicle sensor data (e.g., accelerometer data, speedometer data, steering wheel data, throttle data, global position system (GPS) data, etc.) and driver observation data (e.g., data from a camera observing the driver). In some embodiments, risky operator behavior comprises drowsy driving. Driver observation data is processed to create face tracking data (e.g., head direction data, gaze direction data, eyelid fraction open/closed data, etc.). In some embodiments, driver observation data is received from a camera mounted on or near the rear-view mirror. In some embodiments, driver observation data is received from a camera mounted on the dashboard. In some embodiments, driver observation is received from a combination of sources. Baseline vehicle sensor data and face tracking data are collected during normal vehicle operation and a degree of drowsiness metric is established through review of anomalous events. For example, anomalous events are reviewed by a human reviewer and a degree of drowsiness (e.g., slightly drowsy, drowsy, very drowsy, asleep) is assigned to the event and correlated with received vehicle sensor data and face tracking data associated with the event. In some embodiments, an initial model is built using driving simulations (e.g., data is collected while a drowsy person operates a driving simulator). In some embodiments, the degree drowsiness metric is determined using a neural network trained using the reviewed data. In some embodiments, the degree drowsiness metric is determined using a statistical model trained using the reviewed data. Computed degree of drowsiness is compared with a threshold at a predetermined rate (e.g., ten times a minute, once a second, twice a second, etc.). If it is determined that the driver is drowsy with a high degree of confidence, a drowsy driver event is triggered and the driver is warned. In some embodiments, triggering a drowsy driver event comprises capturing data (e.g., storing camera data, sensor data, etc. in a memory). In some embodiments, triggering a drowsy driver event comprises transmitting captured data (e.g., to a vehicle data server). In various embodiments, a warning comprises an audible warning (e.g., a buzzer, music, a voice recording, etc.), an illumination warning (e.g., a flashing light), a haptic warning (e.g., a warning felt through the steering wheel or the seat), or any other appropriate warning. If it is determined that the driver is drowsy with a lower degree of confidence, a drowsy driver event is triggered but no warning is given (e.g., data from sensors, camera, microphone, etc. is recorded).

In some embodiments, a circular data buffer enables storing information regarding information leading up to the event, during the event, and after the event.

FIG. 1 is a block diagram illustrating an embodiment of a system for direct observation event triggering of drowsiness. In the example shown, vehicle event recorder 102 comprises a vehicle event recorder mounted in vehicle 104. Vehicle 104 comprises a vehicle—for example, a car, a truck, a commercial vehicle. In some embodiments, vehicle event recorder 102 comprises a set of sensors—for example, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolution per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, outputs from an advanced driver assistance system (ADAS) are included in the set of sensors describing the vehicle state. For example, an ADAS lane detection and tracking (LDAT) signal can provide information about how the driver is managing the vehicle lane position on a well-marked highway. In some embodiments, vehicle event recorder 102 comprises a system for processing sensor data and detecting events. In some embodiments, vehicle event recorder 102 comprises a system for detecting risky behavior. In some embodiments, vehicle event recorder 102 comprises a system for direct observation event triggering of drowsiness. In various embodiments, vehicle event recorder 102 is mounted on vehicle 108 in one of the following locations: the chassis, the front grill, the dashboard, the rear-view mirror, or any other appropriate location. In some embodiments, vehicle event recorder 102 comprises multiple units mounted in different locations in vehicle 108. In some embodiments, vehicle event recorder 102 comprises a communications system for communicating with network 100. In various embodiments, network 100 comprises a wireless network, a wired network, a cellular network, a local area network, a wide area network, the Internet, or any other appropriate network. Vehicle event recorder 102 communicates with vehicle data server 110 via network 100. Vehicle event recorder 106 comprises a vehicle event recorder mounted in vehicle 108. Vehicle event recorder 106 communicates with vehicle data server 110 via network 100. Vehicle data server 110 comprises a vehicle data server for collecting events and risky behavior detected by vehicle event recorder 102. In some embodiments, vehicle data server 110 comprises a system for collecting data from multiple vehicle event recorders (e.g., vehicle event recorder 102 and vehicle event recorder 106). In some embodiments, vehicle data server 110 comprises a system for analyzing vehicle event recorder data. In some embodiments, vehicle data server 110 comprises a system for displaying vehicle event recorder data. In some embodiments, vehicle data server 110 is located at a home station (e.g., a shipping company office, a taxi dispatcher, a truck depot, etc.). In some embodiments, events recorded by vehicle event recorder 106 are downloaded to vehicle data server 110 when vehicle 108 arrives at the home station. Customer 112 comprises a customer of a vehicle event recorder service, communicating with vehicle data server 110 via network 100, e.g., using a network terminal. In various embodiments, customer 112 accesses vehicle data server 110 to access vehicle event recorder data, access vehicle event recorder detected events, input driver information, input configuring information, request service, make a complaint, pay a bill, or for any other appropriate reason.

Figure 2:
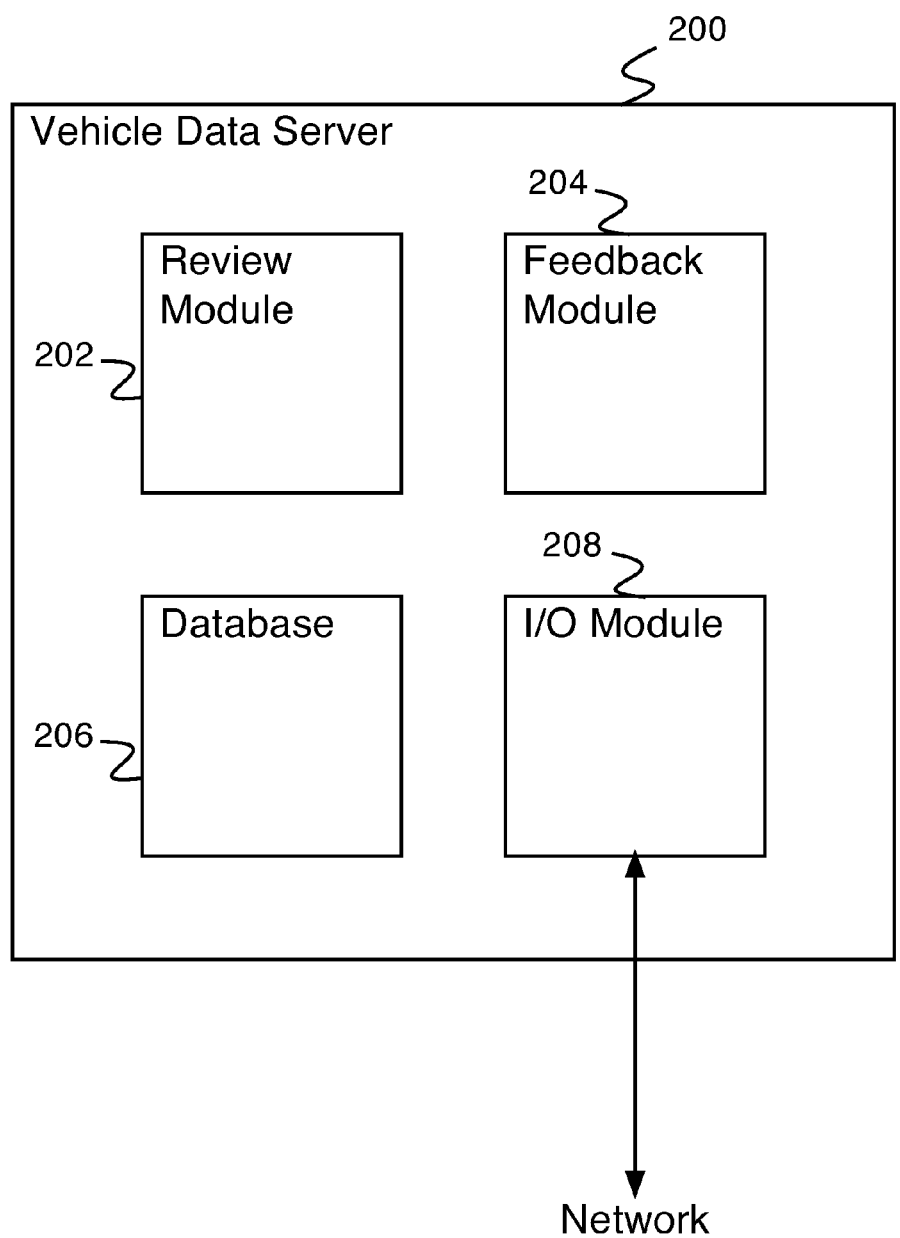
FIG. 2 is a block diagram illustrating an embodiment of a vehicle data server.

FIG. 2 is a block diagram illustrating an embodiment of a vehicle data server. In some embodiments, vehicle data server 200 comprises vehicle data server 110 of FIG. 1. In the example shown, vehicle data server 200 comprises a vehicle data server for receiving, storing, and processing vehicle data, and for creating, storing, and transmitting vehicle event recorder update data. In some embodiments, vehicle data server 200 comprises a system for displaying vehicle data. Vehicle data server 200 comprises review module 202, feedback module 204, database 206, and input/output (I/O) module 208. Review module 202 comprises a review module for reviewing events. For example, review module 202 comprises a module for reviewing event data (e.g., video data, audio data, sensor data, etc.). In some embodiments, review module 202 comprises a module for determining an event score. In some embodiments, review module 202 comprises a module for delivering an event score to a supervisor. In various embodiments, an event score is used for updating parameters, thresholds, or algorithms on a vehicle event recorder (e.g., vehicle event recorder 106 of FIG. 1), or for any other appropriate purpose. Feedback module 204 comprises a feedback module for feeding back an event score to a vehicle event recorder. Feedback module 204 updates parameters, thresholds, or algorithms on the vehicle event recorder. Database 206 comprises a database for storing data. For example, database 206 stores event data, event score data, parameter data, threshold data, algorithm data, or any other appropriate data. I/O module 208 comprises an I/O module for communicating with a network (e.g., network 100 of FIG. 1). In some embodiments, I/O module 208 receives event data. In some embodiments, I/O module 208 transmits vehicle event recorder update data.

Figure 3:
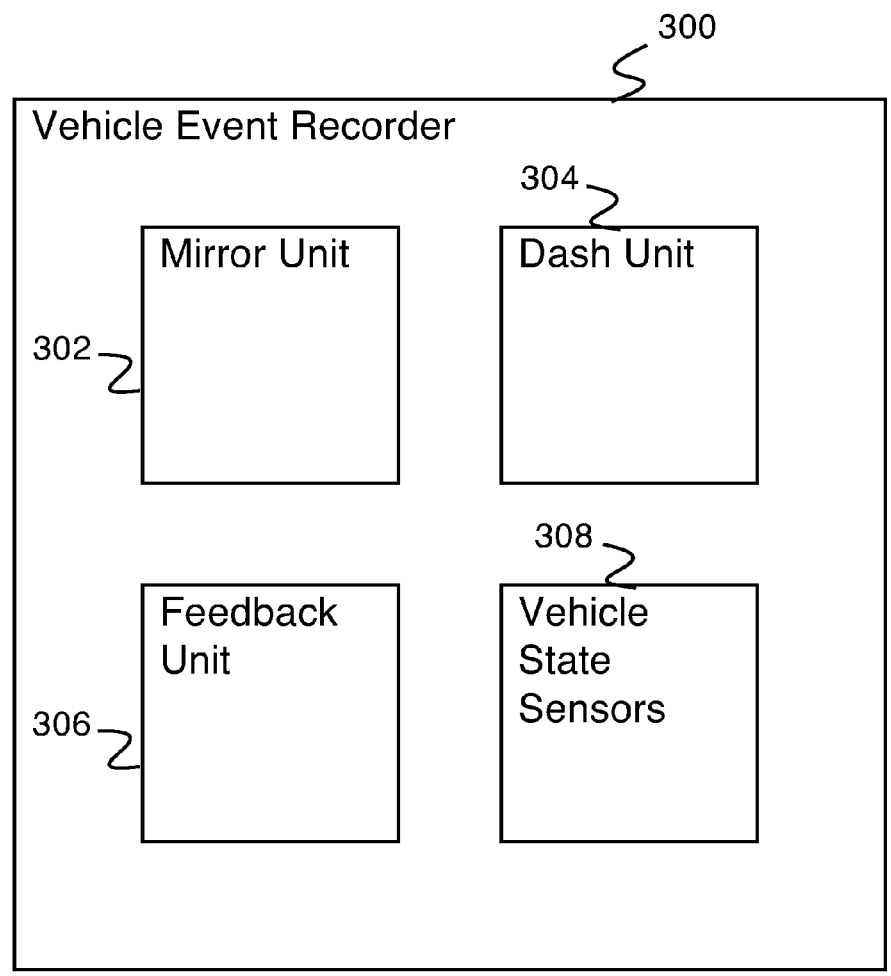
FIG. 3 is a block diagram illustrating an embodiment of a vehicle event recorder.

FIG. 3 is a block diagram illustrating an embodiment of a vehicle event recorder. In some embodiments, vehicle event recorder 300 comprises vehicle event recorder 106 of FIG. 1. In the example shown, vehicle event recorder 300 comprises a vehicle event recorder for recording vehicle events. In some embodiments, vehicle event recorder 300 comprises a single unit placed at an appropriate location in a vehicle. In some embodiments, vehicle event recorder 300 comprises a set of units placed at different locations within the vehicle. For example, vehicle event recorder 300 comprises mirror unit 302, dash unit 304, feedback unit 306, and interface onboard sensors 308. Mirror unit 302 comprises a vehicle event recorder unit mounted on the rear-view mirror. In some embodiments, mirror unit 302 comprises a road-facing camera. In some embodiments, mirror unit 302 is mounted on the rear-view mirror in order to get a good view of the road. In some embodiments, mirror unit 302 additionally comprises a driver-facing camera. In various embodiments, mirror unit 302 additionally comprises sensors, data storage, data processing, data communications, or any other appropriate vehicle event recorder components.

Dash unit 304 comprises a vehicle event recorder unit mounted on the dashboard. In some embodiments, dash unit 304 comprises a driver-facing camera. In some embodiments, dash unit 304 is mounted on the dash in order to get a good view of the driver. In some embodiments, dash unit 304 additionally comprises a road-facing camera. In various embodiments, dash unit 304 additionally comprises sensors, data storage, data processing, data communications, or any other appropriate vehicle event recorder components. In some embodiments, dash unit 304 comprises communications (e.g., wired communications, wireless communications) with mirror unit 302. Feedback unit 306 comprises a feedback unit for providing driver feedback. In various embodiments, feedback unit 306 provides video feedback (e.g., via a screen, a light emitting diode(s) (LED(s)), etc.), audio feedback, haptic feedback (e.g., via actuators in the seat, in the steering wheel, etc.), or any other appropriate feedback. In various embodiments, feedback from feedback unit 306 informs the driver that an event has been detected, that the driver is driving recklessly, that the driver is getting sleepy, or any other appropriate information. Vehicle state sensors 308 comprise vehicle state sensors for measuring vehicle state. In various embodiments, a vehicle state sensor comprises a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors.

Figure 4:
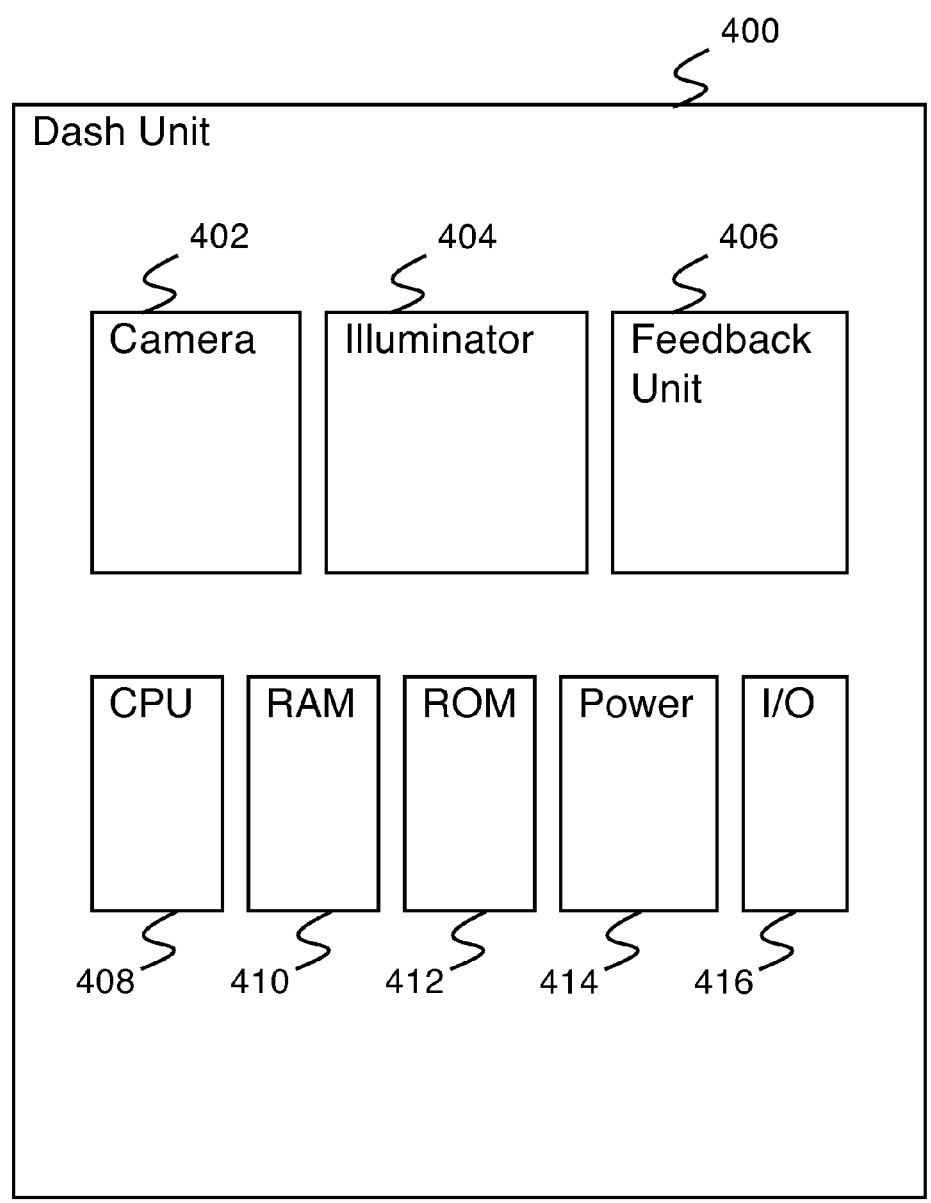
FIG. 4 is a block diagram illustrating an embodiment of a dash unit of a vehicle event recorder.

FIG. 4 is a block diagram illustrating an embodiment of a dash unit of a vehicle event recorder. In some embodiments, dash unit 400 comprises dash unit 304 of FIG. 3. In the example shown, dash unit 400 comprises camera 402 and illuminator 404. Illuminator 404 comprises an illuminator matched to the wavelength of camera 402. Camera 402 comprises an infrared camera and illuminator 404 comprises an infrared illuminator. In various embodiments, camera 402 comprises a driver-facing camera, a road-facing camera, a combination of cameras, or any other appropriate camera or cameras. In various embodiments, camera 402 comprises a visible light camera, and infrared light camera, or any other appropriate type of camera. Dash unit 400 additionally comprises feedback unit 406. Feedback unit 406 comprises a feedback unit for informing the driver of the dash unit state. In various embodiments, feedback unit 406 informs the driver if the dash unit is turned on, if the dash unit is communicating with the mirror unit, if the dash unit has locked on to the face of the driver, or of any other appropriate dash unit state. Dash unit 400 additionally comprises CPU (e.g., central processing unit) 408, RAM (e.g., random access memory) 410, ROM (e.g., read only memory) 412, power 414, and I/O (e.g., input/output communications) 416. CPU 408, RAM 410 and ROM 412 act together to provide data processing capabilities for dash unit 400. Power 414 comprises a connection to the vehicle power supply to power dash unit 400. In some embodiments, power 414 comprises a direct connection to the vehicle alternator. In some embodiments, power 414 comprises a connection to the power supply of the mirror unit. In various embodiments, power 414 additionally comprises a capacitor, a battery, a linear regulator, a switching regulator, a buck converter, or any other appropriate power management hardware. I/O 416 comprises an I/O connection for communicating data. In some embodiments, I/O 416 comprises a connection for communicating data to the mirror unit. In some embodiments, I/O 416 comprises a connection for communicating data to the feedback unit (e.g., feedback unit 306 of FIG. 3). In some embodiments, I/O 416 comprises a wireless connection to the feedback unit (e.g., a Bluetooth™ connection).

In the example shown, dash unit 400 comprises a system for collecting and processing driver video data. CPU 408 receives and processes driver video from camera 402. CPU 408 extracts face and eye tracking data as well as facial geometry parameters from the video. Face and eye tracking data and facial geometry parameters are sent to the mirror unit (e.g., via I/O 416). Face and eye tracking data are used by the mirror unit to determine a driver state. Facial geometry parameters are used by the mirror unit to identify the driver.

While locked to the driver's face, a driver-facing camera system allows us to compute features such as:

A. Eye closure state

Percentage of eye closure (often abbreviated as PERCLOS) describes the percentage time, measured over some fixed interval, that the eyes are closed. In some embodiments, the eye closure threshold used for PERCLOS is 80%. This threshold is often varied to produce multiple features. These features can be updated continuously—for example, representing the average eye closure state over the past few minutes at each moment.

Eye closure duration is another feature class that applies to individual instances. Extreme closure durations are associated with microsleep events—instances in which the eyes remain in a closed state for an unusually long time. Thresholds of 0.5 and 1 second are typical for identifying microsleep events. At lesser levels of fatigue, the mean closure duration during eye closure events can be maintained as a feature averaged over time intervals and/or the last several events.

Mean eye closure is the average degree of eye closure over time.

Blink rate, amplitude, and speed as well as composite features such as the ratio of amplitude to speed are used as features.

B. Head position

Head pitch angle is used to detect nodding associated with increased fatigue.

Excessive or erratic head movements are associated with increased fatigue.

C. Gaze direction

Gaze direction is a strong indicator of inattention in various circumstances. This feature must in most cases be fused with other signals to indicate fatigue.

Each of these camera-based features is typically normalized to determine a baseline for each particular driver. This normalization is performed at the start of each trip or continuously using various signal averaging techniques. These features are captured by a camera system comprising one or more cameras that are oriented to ensure capture of the driver's face during normal driving conditions when the driver is tracking the road ahead. Most systems use a minimum video capture rate of 30 to 60 fps to capture all of the features listed above.

The use of IR illumination and a camera with an IR cut filter is common for in-vehicle driver observation systems. Such a setup allows for operation at night and can help mitigate issues that arise from variable lighting conditions in the daytime. The use of eye glasses causes problems with the capture of these features in some cases. In some embodiments, multiple illuminators intended to illuminate the driver alternately from the left and then from the right are often used to reduce the effects of lighting gradients, e.g. when the sun is shining on the driver from one side. Each illuminator is synchronized in turn with particular video frames. These video frames, used in pairs, provide data that is used to normalize the effective light exposure across the driver's face, resulting in an image in which the driver's face appears to be illuminated more evenly on the left and the right. The result is a video sequence that can be processed more accurately by face detection and eye tracking algorithms.

Figure 5:
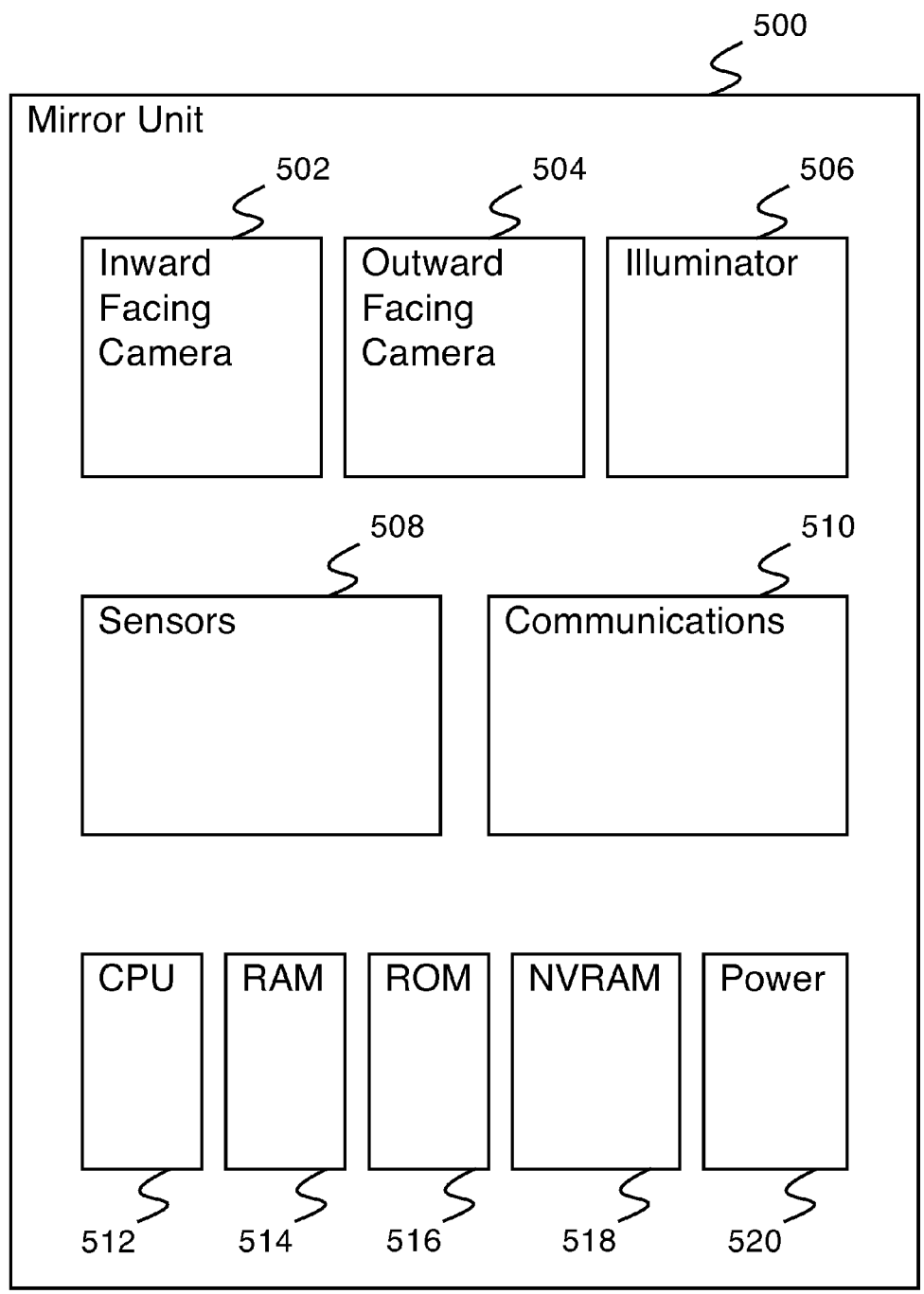
FIG. 5 is a block diagram illustrating an embodiment of a mirror unit of a vehicle event recorder.

FIG. 5 is a block diagram illustrating an embodiment of a mirror unit of a vehicle event recorder. In some embodiments, mirror unit 500 comprises mirror unit 302 of FIG. 3. In the example shown, mirror unit 500 comprises inward facing camera 502, outward facing camera 504, and illuminator 506. Inward facing camera 502 captures an image of the driver. Outward facing camera 504 captures an image of the road. In various embodiments, inward facing camera 402 comprises a visible light camera, and infrared light camera, or any other appropriate type of camera. Illuminator 506 comprises an illuminator matched to the wavelength of inward facing camera 502. Camera 502 comprises an infrared camera and illuminator 506 comprises an infrared illuminator. In some embodiments, a dash unit (e.g., dash unit 304 of FIG. 3) is not present in the system, and inward facing camera 502 is used to take its place. In some embodiments, if a dash unit is present in the system, inward facing camera 502 is not used. Mirror unit 500 additionally comprises sensors 508 and communications 510. In various embodiments, sensors 508 comprise video recorders, audio recorders, accelerometers, gyroscopes, vehicle state sensors, GPS, outdoor temperature sensors, moisture sensors, laser line tracker sensors, or any other appropriate sensors. In some embodiments, mirror unit 500 processes sensor data to detect events. In some embodiments, sensors 508 include external trigger lines—for example, external inputs for manual event triggering (e.g., via a button). In some embodiments, mirror unit 500 comprises a button accessible to a driver for manual event triggering via the external trigger lines. In some embodiments, an external button is connected to mirror unit 500 for manual event triggering via the external trigger lines. In some embodiments, manual event triggering is used when a driver wishes to manually trigger an event and start storing data (e.g., start inward facing camera 502 or outward facing camera 504 recording).

Communications 510 comprises a communications system for communicating with the dash unit and with a network (e.g., network 100 of FIG. 1). In various embodiments, communications with the dash unit comprise wired communications, wireless communications, or any other appropriate communications. In some embodiments, communications 510 additionally comprises a communications system for communicating with a feedback unit (e.g., feedback unit 306 of FIG. 3). In various embodiments, communications with the feedback unit comprise wired communications, wireless communications, or any other appropriate communications. In various embodiments, communications with the network comprise wired communications (e.g., communicating via a docking station), wireless communications (e.g., cellular communications, communications via wireless Ethernet upon reaching a home station, etc.), or any other appropriate communications. Mirror unit 500 additionally comprises CPU 512, RAM 514, ROM 516, NVRAM (e.g., non-volatile random access memory) 518, and power 520. CPU 512, RAM 514, ROM 516, and NVRAM 518 act together to provide data processing and storage capabilities for mirror unit 500. In various embodiments, NVRAM 518 stores sensor data, event data, face tracking data, face geometry parameter data, map data, state data, or any other appropriate data. Power 520 comprises a connection to the vehicle power supply to power mirror unit 500. In some embodiments, power 520 comprises a direct connection to the vehicle alternator. In some embodiments, power 520 comprises a connection to the power supply of the dash unit. In various embodiments, power 520 additionally comprises a capacitor, a battery, a linear regulator, a switching regulator, a buck converter, or any other appropriate power management hardware.

Figure 6:
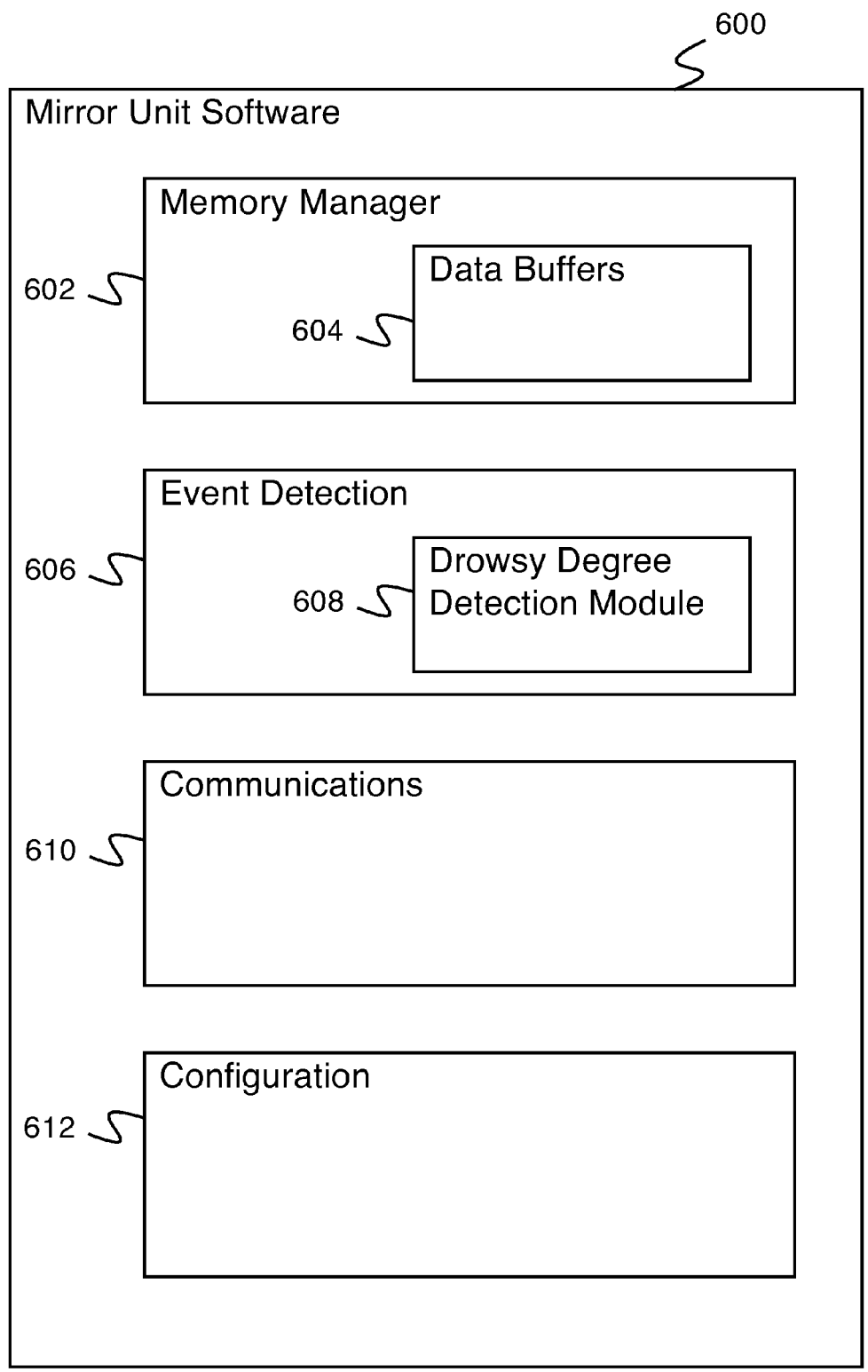
FIG. 6 is a block diagram illustrating an embodiment of software for a mirror unit.

FIG. 6 is a block diagram illustrating an embodiment of software for a mirror unit. In some embodiments, the software of FIG. 6 is executed by mirror unit 500 of FIG. 5 (e.g., stored in ROM 516 of FIG. 5 and executed by CPU 512 of FIG. 5). In the example shown, mirror unit software 600 comprises memory manager 602, event detection 606, communications 608, and configuration 610. Memory manager 602 comprises data buffers 604. Memory manager 602 coordinates reading from and writing to data buffers 604. In some embodiments, data buffers 604 comprise circular data buffers enabling information regarding information leading up to the event, during the event, and after the event to be stored as part of storing data regarding the event. Circular data buffers comprise data buffers for recording a continuous stream of data by treating the buffer as a loop (e.g., writing into the buffer until the end is reached and then restarting at the beginning overwriting previously stored data). In various embodiments, data buffers comprise image data buffers, sensor data buffers, face and eye tracking data buffers, or any other appropriate data buffers. Event detection 606 comprises event detection algorithms for processing data (e.g., data stored in data buffers 604) and detecting events (e.g., accident events, unsafe driving events, etc.). In some embodiments, event detection 606 processes face tracking data (e.g., face direction data, gaze direction data, eyelid fraction open/closed data, etc.) and detects events. In some embodiments, event detection 606 combines face tracking data with other data (e.g., accelerometer data, GPS data, vehicle state sensor data, etc.) and detects events. In some embodiments, event detection 606 additionally detects events triggered by external trigger lines. In some embodiments, external trigger lines are used by a driver to manually trigger an event and start recording data (e.g., start recording video data).

Sensors such as accelerometers, rate gyros, and GPS receivers provide additional signals that can help determine the driver's attentiveness in real-time during vehicle operation. The vehicle computer can also provide signals such as steering wheel position, throttle position, and brake pedal position. GPS data combined with on-board map data can also provide valuable contextual information about vehicle and road conditions. Standard deviation of lateral position is a significant driver performance feature that can help determine the level of sleepiness when fused with other factors. A lateral accelerometer, rate gyro, or steering wheel position are used in any combination to track the lateral position deviation during lane tracking Map data are used to determine road curvature. Advanced driver assistance system's (ADAS) lane tracking systems provide valuable information about driver performance when actively tracking a well-marked roadway. A headway warning system is able to provide information about how the driver is managing vehicle spacing. An additional non-video indicator is time. The longer a driver drives, the greater the likelihood of fatigue and drowsiness. The system accounts for the duration of continuous vehicle operation as an additional feature.

Event detection 606 additionally comprises drowsy degree detection module 608. Drowsy degree detection module 608 processes face tracking data and determines a degree of drowsiness. In some embodiments, drowsy degree detection module processes a combination of face tracking and sensor data (e.g., accelerometer data, GPS data, vehicle state sensor data, etc.) to determine a degree of drowsiness. In various embodiments, drowsy degree detection module 608 reports that the driver is drowsy or not drowsy; reports that the driver is more drowsy, less drowsy, or not drowsy; reports that the driver drowsiness on a scale of 1 to 10 (e.g., using the Karolinska sleepiness scale); reports different qualities of driver drowsiness (e.g., eyes closing, more frequent blinking, head nodding, etc.); or reports drowsy degree in any other appropriate way. Drowsy degree detection module 608 processes face tracking data and sensor data stored in data buffers 604 and triggers events when appropriate; event data is recorded and stored with an indication of driver drowsiness. Drowsy driving events are later reviewed by a review module and the performance of drowsy degree detection module 608 is evaluated. In various embodiments, drowsy degree detection module 608 comprises a rule-based drowsiness detection model, a statistically trained drowsiness detection model, a neural network based drowsiness detection model, an automatically calibrating anomaly detection model, or any other appropriate drowsiness detection module. After the performance of drowsy degree detection module 608 is evaluated, feedback is provided to the drowsy degree detection module 608 by the feedback module, and the module is updated if necessary to improve drowsiness detection performance.

Communications software 610 comprises communications software for communicating with a network. Configuration software 612 comprises configuration software for receiving configuration data (e.g., from a driver, from a supervisor via communications 610, etc.) and configuring software. In various embodiments, configuration software 612 configures mirror unit software 600, dash unit software (e.g., software for dash unit 304 of FIG. 3), feedback unit software (e.g., software for feedback unit 306 of FIG. 3), or any other appropriate software. In various embodiments, configuration software 612 configures parameters for triggering events, parameters for communicating (e.g., for communicating with a vehicle data server), vehicle type parameters, or any other appropriate parameters.

Figure 7:
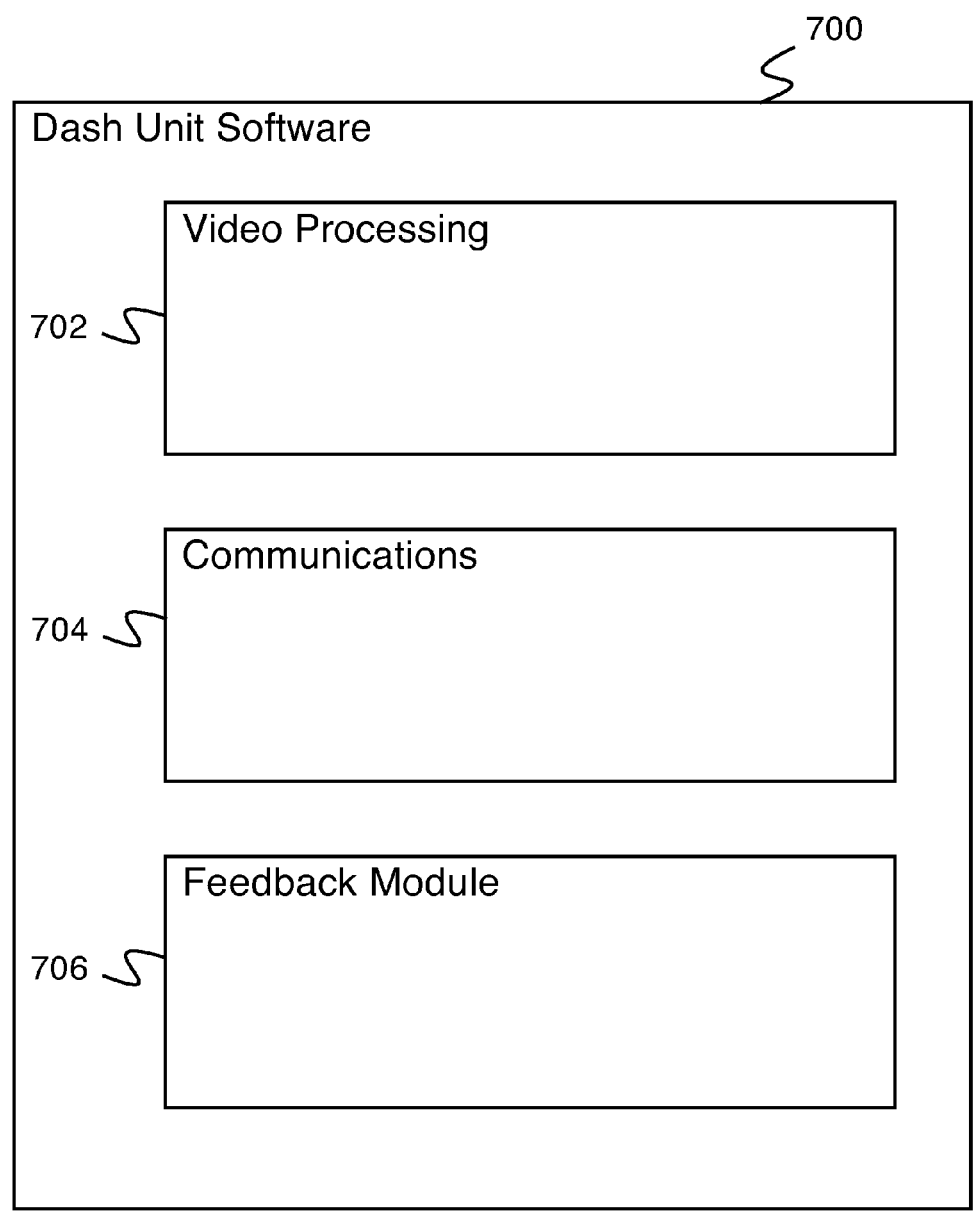
FIG. 7 is a block diagram illustrating an embodiment of software for a dash unit.

FIG. 7 is a block diagram illustrating an embodiment of software for a dash unit. In some embodiments, dash unit software is executed by dash unit 400 of FIG. 4 (e.g., stored in ROM 412 of FIG. 4 and executed by CPU 408 of FIG. 4). In the example shown, dash unit software 700 comprises video processing 702, feedback manager 704, and communications 706. Video processing 702 comprises video processing for extracting face geometry parameters and face tracking data from a driver-facing camera. In some embodiments, face tracking data is sent via an interface to or from a processor. In some embodiments, video processing 702 extracts face tracking data (e.g., head direction data, gaze direction data, eyelid fraction open/closed data, etc.). In some embodiments, video processing 702 extracts facial geometry parameter data. Communications 704 comprises communications for communicating with the mirror unit. In some embodiments, communications 704 comprises communications for communicating video processing data (e.g., face tracking data, facial geometry parameter data) to the mirror unit. In some embodiments, communications 704 comprises a buffer for storing information prior to communication. In some embodiments, communications 704 transmits data immediately upon determination of the data. In various embodiments, dash unit software 700 receives instructions, commands, configurations, program updates, or any other appropriate information from the mirror unit via communications 704. Feedback module 706 comprises a feedback module for controlling feedback to the driver (e.g., via lights, sound, etc.).

Figure 8:
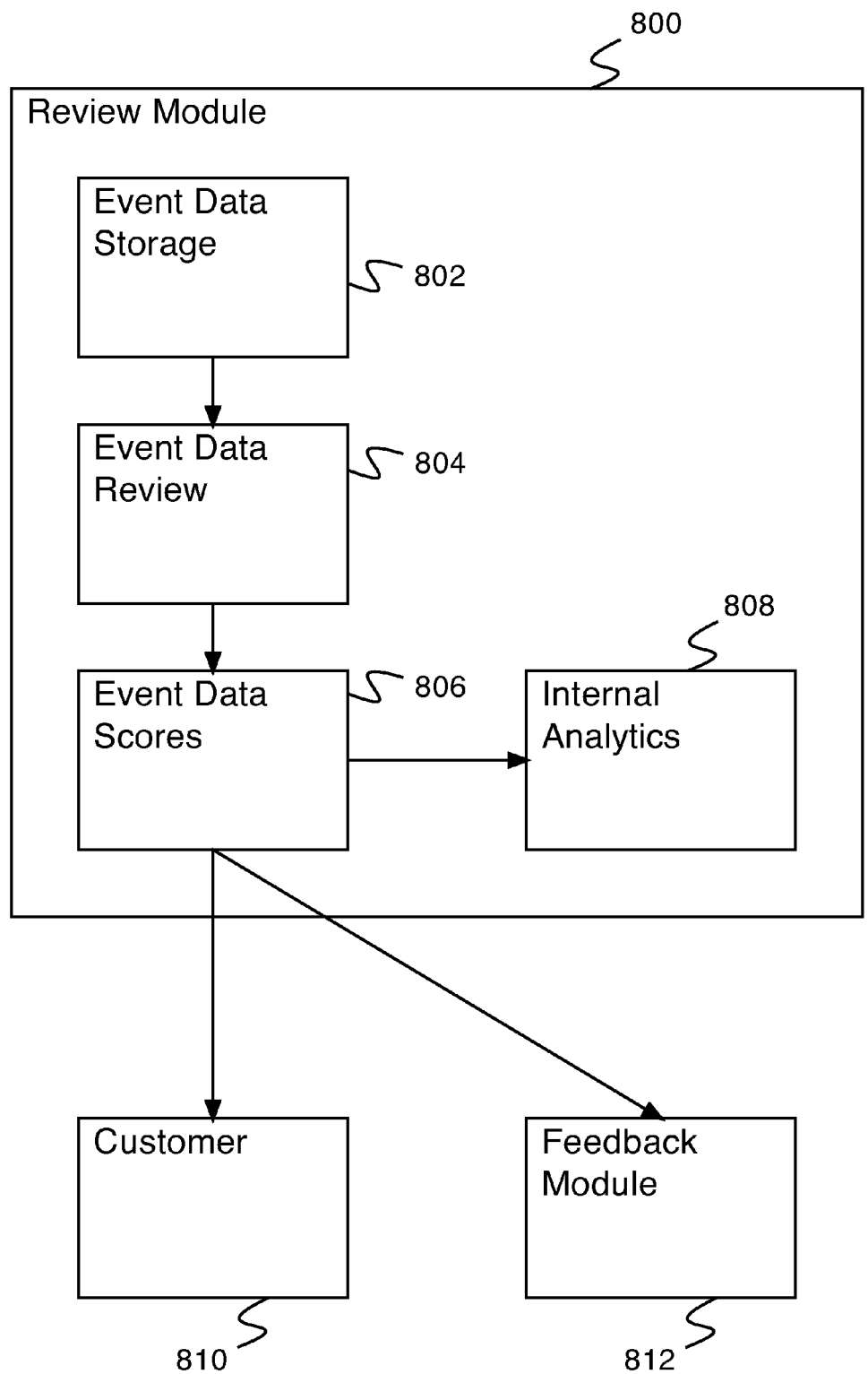
FIG. 8 is a block diagram illustrating an embodiment of software for a review module.

FIG. 8 is a block diagram illustrating an embodiment of software for a review module. In some embodiments, review module software 800 is executed by review module 202 of FIG. 2. In the example shown, review module 800 comprises event data storage 802, event data review 804, event data scores 806, and internal analytics 808. Event data storage 802 comprises storage for event data recorded by a vehicle event recorder (e.g., by event recorder sensors, by a road-facing camera, by a driver-facing camera, etc.). Event data storage 802 receives event data after an event is captured by a vehicle event recorder and the event is uploaded to the vehicle data server. Event data review 804 reviews event data from event data storage 802. Event data review 804 determines what happened during an event and produces an appropriate event data score. In some embodiments, event data review 804 comprises human reviewers who examine event data and score the events. In some embodiments, event data review 804 comprises software for automatically processing event data and producing scores. Scores produced by event data review 804 are stored in event data scores 806. Internal analytics 808 receives event data scores 806. In various embodiments, internal analytics 808 uses event data scores 806 to improve the overall risk models and assessment, driving score behavior, driver performance scoring, or any other appropriate internal analytic. Customer 810 additionally receives event data scores 806. In various embodiments, customer 810 comprises drivers, driver coaches, driver supervisors, driver databases, or any other appropriate customer. Customer 810 uses event data scores to track driver performance and determine appropriate driver feedback (e.g., driver coaching, driver rewards, driver punishment, etc.). In some embodiments, customer 810 uses event data scores in addition to event data as a permanent record of driving events (e.g., to defend itself in case of litigation, dispute, etc.). Feedback module 812 additionally receives event data scores 806. Feedback module 812 uses event data scores to update algorithms and event detection thresholds. In some embodiments, feedback module 812 uses event data scores to improve a drowsy driving detection algorithm (e.g., a drowsy driving detection algorithm running on a mirror unit of a vehicle event recorder).

Figure 9:
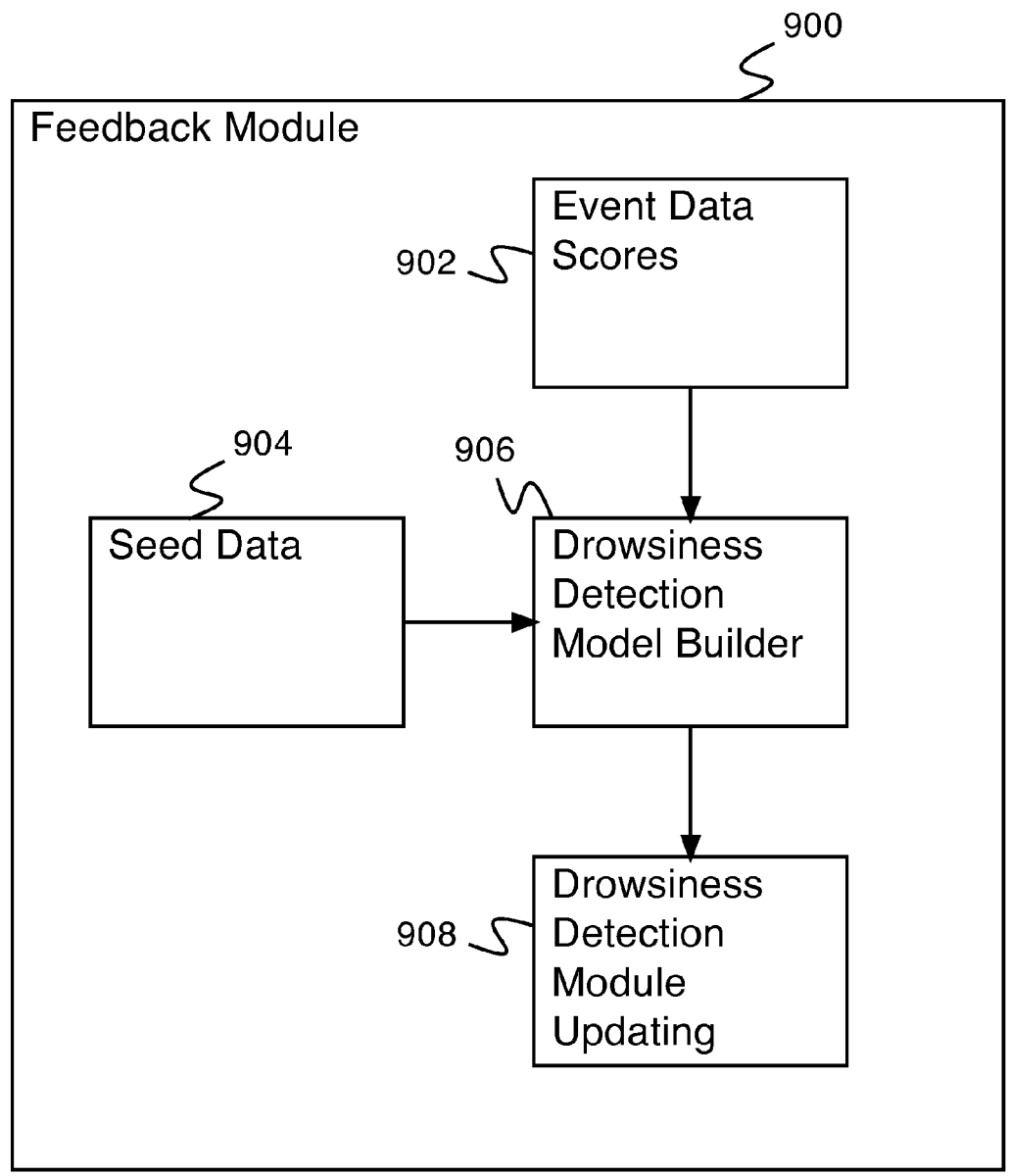
FIG. 9 is a block diagram illustrating an embodiment of software for a feedback module.

FIG. 9 is a block diagram illustrating an embodiment of software for a feedback module. In some embodiments, feedback module software 900 is executed by feedback module 204 of FIG. 2. In the example shown, feedback module 900 comprises a feedback module for updating a drowsiness detection module. Feedback module 900 comprises seed data 904. In various embodiments, seed data 904 comprises simulated data recorded by a driving simulator (e.g., a person operating a driving simulator under different conditions of drowsiness), simulated data created by a software simulation of a drowsy driver, historical data received from previous drowsy driving data collection, or any other appropriate seed data. In various embodiments, seed data comprises face tracking data, accelerometer data, GPS data, vehicle state sensor data, or data from any other appropriate sensor or combination of sensors. Seed data is used by drowsiness detection model builder 906 to create an initial drowsiness detection model. In various embodiments, drowsiness detection model builder 906 creates a rule-based model by creating and adapting detection rules based on seed data 904, drowsiness detection model builder 906 uses seed data 904 to train a statistical drowsiness detection model, drowsiness detection model builder 906 uses seed data 904 to train a neural network based drowsiness detection model, or uses seed data 904 to create a drowsiness detection model in any other appropriate way. Drowsiness detection module updating 908 updates the drowsiness detection module (e.g., drowsiness detection module 608 of FIG. 6) using the model created by drowsiness detection model builder 906. Event data scores 902 receives event data scores from a review module (e.g., from review module 800 of FIG. 8).

In some embodiments, event data scores 902 receives event data scores for drowsy driving events. In some embodiments, event data scores 902 comprises a combination of event data scores and event data (e.g., face tracking data, accelerometer data, GPS data, vehicle state sensor data, etc.) In some embodiments, data received by event data scores 902 reflect a drowsiness degree different from that detected by the drowsiness detection model. The drowsiness detection model has not yet been properly trained. Event data scores 902 are received by drowsiness detection model builder 906 and used to supplement seed data 904 in order to further improve the model. Periodically (e.g., once a day, once a month, once a year, once 100 event data scores have been received, once 1000 event data scores have been received, etc.) the drowsiness detection model built by drowsiness detection model builder 906 is uploaded by drowsiness detection module updating and replaces the previous model. Thus, the drowsy degree detection module learns as data is collected. In various embodiments, the model reflects data collected for a single driver, the model reflects data collected for all drivers for a given customer, the model reflects data collected for all drivers using the vehicle event recorder system, or the model reflects data collected for any other appropriate driver subset.

Figure 10A:
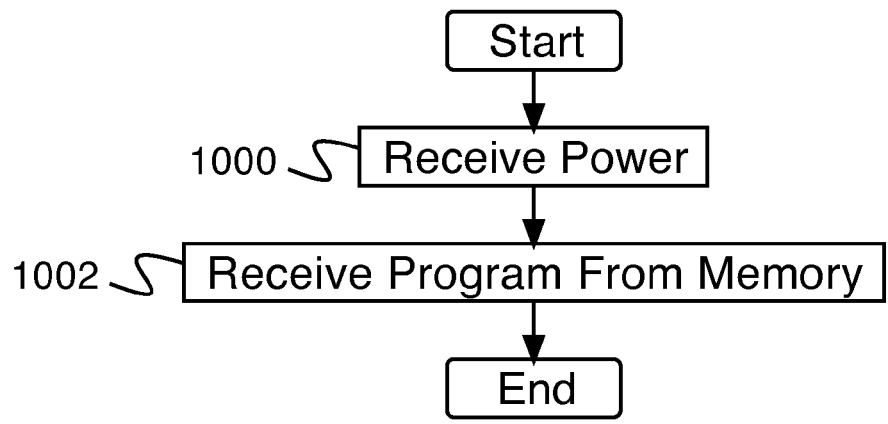
FIG. 10A is a flow diagram illustrating an embodiment of a process for initializing a dash unit.

FIG. 10A is a flow diagram illustrating an embodiment of a process for initializing a dash unit. In some embodiments, the process of FIG. 10A is used to initialize dash unit 400 of FIG. 4. In the example shown, in 1000, power is received. In 1002, a program is received from a memory. In some embodiments, the program received from a read only memory or a programmable memory that is used to coordinate normal operation of the dash unit.

Figure 10B:
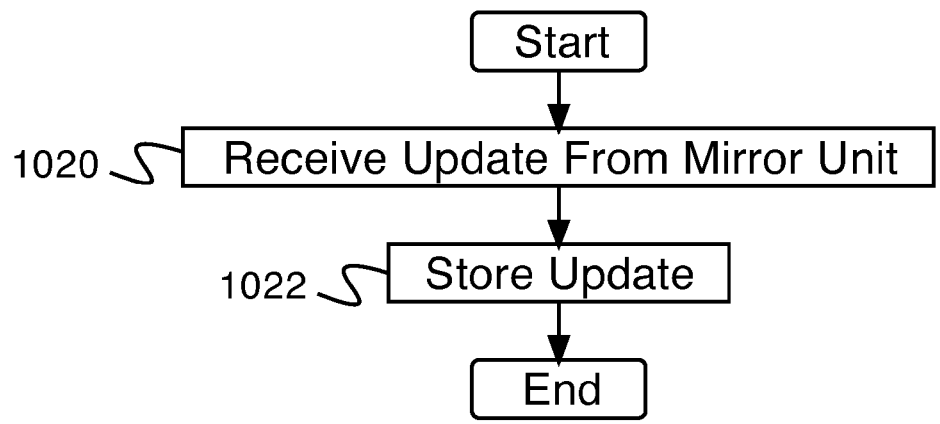
FIG. 10B is a flow diagram illustrating an embodiment of a process for updating a dash unit.

FIG. 10B is a flow diagram illustrating an embodiment of a process for updating a dash unit. In some embodiments, the process of FIG. 10B is used to update dash unit 400 of FIG. 4. In the example shown, in 1020, an update is received from a mirror unit. In 1022, the update is stored. In some embodiments, an update is stored in a memory (e.g., by re-flashing a programmable memory's contents).

Figure 11A:
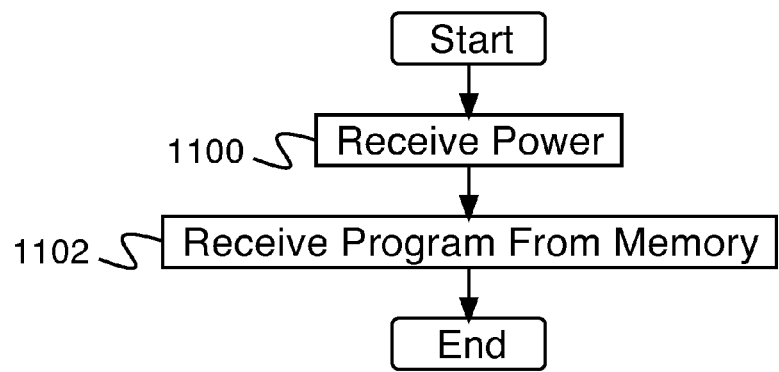
FIG. 11A is a flow diagram illustrating an embodiment of a process for initializing a mirror unit.

FIG. 11A is a flow diagram illustrating an embodiment of a process for initializing a mirror unit. In some embodiments, the process of FIG. 11A is used to initialize mirror unit 500 of FIG. 5. In the example shown, in 1100, power is received. In 1102, a program is received from a memory. In some embodiments, the program received from memory is used to coordinate normal operation of the mirror unit.

Figure 11B:
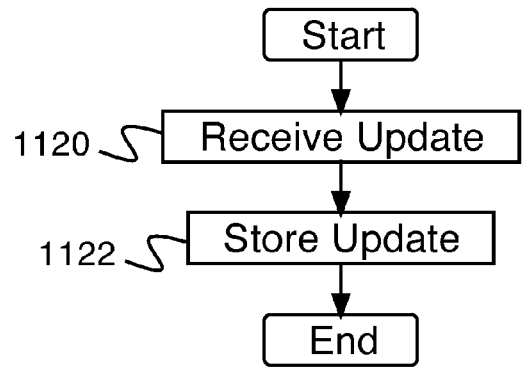
FIG. 11B is a flow diagram illustrating an embodiment of a process for updating a mirror unit.

FIG. 11B is a flow diagram illustrating an embodiment of a process for updating a mirror unit. In some embodiments, the process of FIG. 11B is used to update mirror unit 500 of FIG. 5. In the example shown, in 1120, an update is received (e.g., from a vehicle data server). In 1122, the update is stored. In some embodiments, an update is stored in memory (e.g., by re-flashing the memory's contents).

Figure 11C:
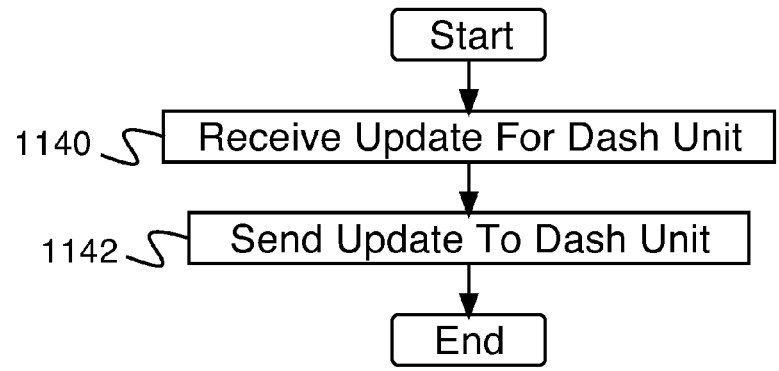
FIG. 11C is a flow diagram illustrating an embodiment of a process for relaying a dash unit update.

FIG. 11C is a flow diagram illustrating an embodiment of a process for relaying a dash unit update. In some embodiments, the process of FIG. 11C is used by mirror unit 500 of FIG. 5 to relay an update to dash unit 400 of FIG. 4. In the example shown, in 1140, an update is received for the dash unit (e.g., from a vehicle data server). In 1142, the update is sent to the dash unit.

Figure 12:
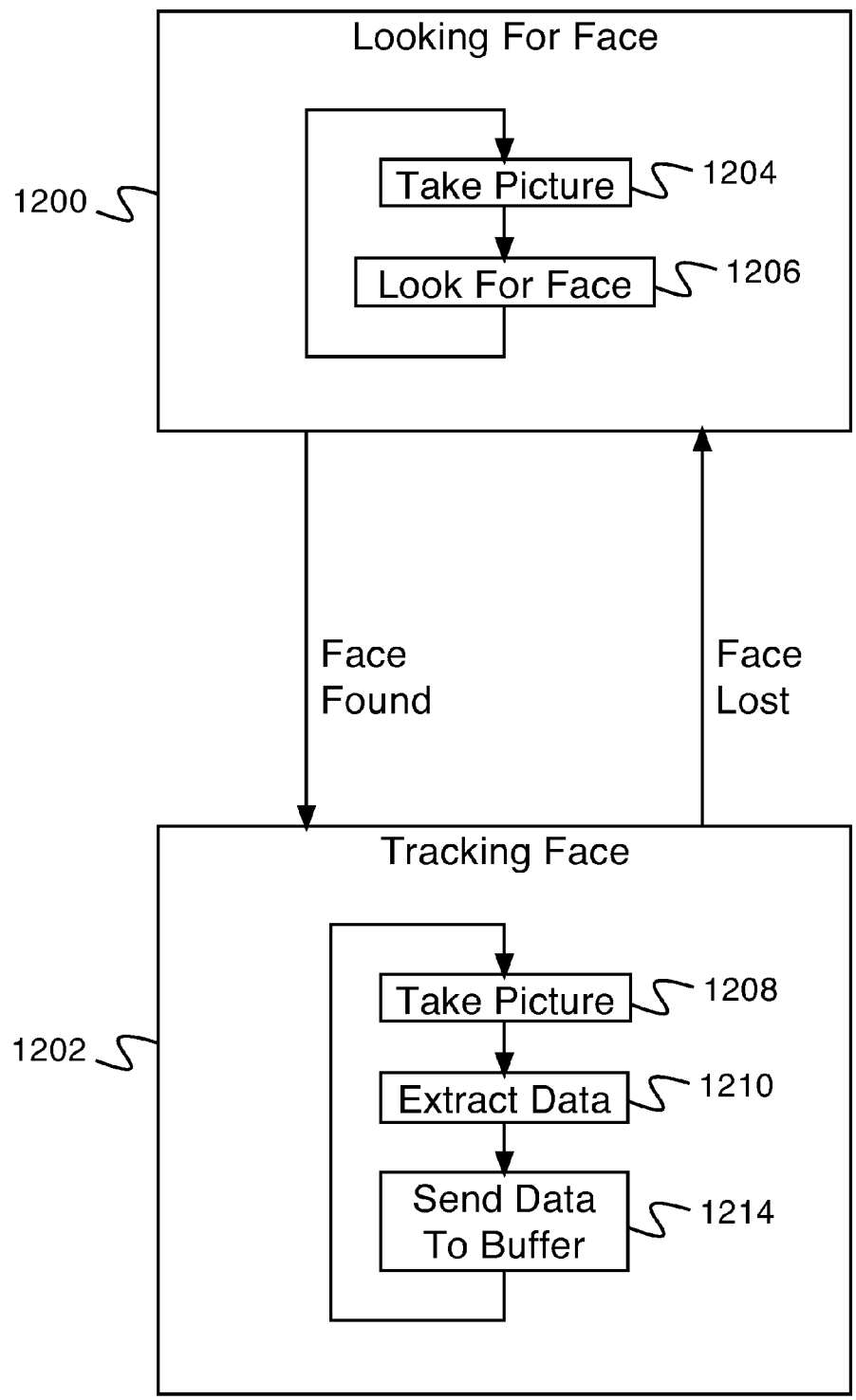
FIG. 12 is a flow diagram illustrating an embodiment of a state machine for face tracking.

FIG. 12 is a flow diagram illustrating an embodiment of a state machine for face tracking. In some embodiments, the state machine of FIG. 12 is executed by video processing 702 of FIG. 7. In the example shown, the state machine begins at 1200. In 1200, the state machine is in the state of looking for a face. When the state machine is in the state indicated by 1200, it executes the process indicated by 1204 and 1206. In 1204, a picture is taken (e.g., a picture of a driver is taken with a driver-facing camera). In 1206, the process looks for a face. While a face is not found, the process repeats. In the event that a face is found in 1206, the state machine enters the state indicated by 1202. In 1202, the state machine is in the state of tracking a face. When the state machine is in the state indicated by 1202, it executes the process indicated by 1208, 1210, and 1214. In 1208, a picture is taken (e.g., a picture of a driver is taken with a driver-facing camera). In 1210, data is extracted. In various embodiments, head direction data is extracted, gaze direction data is extracted, eyelid fraction open/closed data is extracted, facial geometry data parameter is extracted, or any other appropriate data is extracted. In 1210, data is sent to a buffer (e.g., data buffers 604 of FIG. 6). While a face is found in the picture taken in 1208, the process repeats. When a face is not found, the state machine enters the state of looking for a face.

Figure 13A:
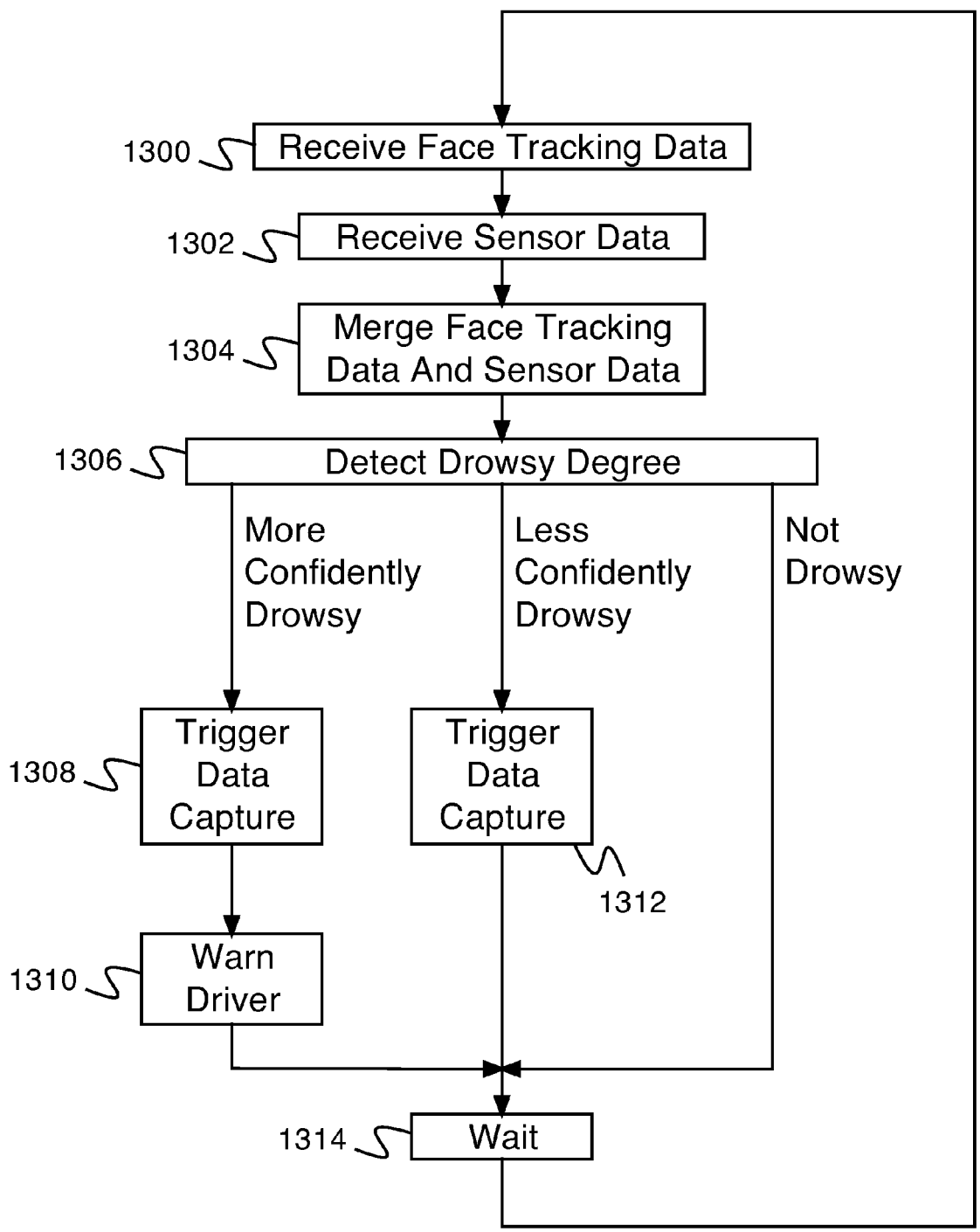
FIG. 13A-B is a flow diagram illustrating an embodiment of a process for detecting a drowsy driving event.

FIG. 13A is a flow diagram illustrating an embodiment of a process for detecting a drowsy driving event. In some embodiments, the process of FIG. 13A is executed by event detection 606 of FIG. 6. In the example shown, in 1300, face tracking data is received. In some embodiments, face tracking data comprises face tracking data stored in a circular data buffer and, for example, transferred from the circular data buffer and stored in a memory. In various embodiments, face tracking data comprises head direction data, gaze direction data, eyelid fraction open/closed data, or any other appropriate data. In 1302, sensor data is received. In some embodiments, sensor data comprises sensor data stored in a circular data buffer and, for example, transferred from the circular data buffer and stored in a memory. In various embodiments, sensor data comprises accelerometer data, GPS data, vehicle state sensor data, or any other appropriate data. In 1304, face tracking data and sensor data are merged. In various embodiments, merging face tracking data and sensor data comprises evaluating a linear function of the face tracking data and the sensor data, evaluating a nonlinear function of the face tracking data and the sensor data, extracting parameters from the face tracking data and from the sensor data and evaluating a function of the parameters, processing the face tracking data and the sensor data with a statistical model, or merging the face tracking data and the sensor data in any other appropriate way. Numerical features to be merged are normalized to have similar mean (e.g., mean value close to zero) and variance (e.g., variance close to one) during typical operating conditions. Boolean features such as microsleep events are expressed with a value of zero when absent and one when present. Relevant features are assembled into a vector of numbers which is updated at a regular interval such as once per second. This feature vector is then evaluated to detect a degree of drowsiness. In some cases, this vector is used as an input to a neural network that is trained to predict the degree of drowsiness. In 1306, a drowsy degree is detected. For example, drowsy degree detection 1306 reports that the driver is more confidently drowsy, less confidently drowsy, or not drowsy. In various embodiments, the drowsy degree detection reports that the driver is drowsy or not drowsy; reports that the driver is more drowsy, less drowsy, or not drowsy; reports that the driver drowsiness on a scale of 1 to 10 (e.g., using the Karolinska sleepiness scale); reports different qualities of driver drowsiness (e.g., eyes closing, more frequent blinking, head nodding, etc.); or reports drowsy degree in any other appropriate way. In various embodiments, the drowsy degree is detected using a rule-based drowsiness detection model, a statistically trained drowsiness detection model, a neural network based drowsiness detection model, an automatically calibrating anomaly detection model, or any other appropriate drowsiness detection module. In some embodiments, drowsy degree is detected by drowsy degree detection module 608 of FIG. 6.

In the event drowsy degree detection 1306 determines the driver is more confidently drowsy, control passes to 1308. In 1308, data capture is triggered. In various embodiments, triggering data capture comprises triggering video recording, triggering audio recording, triggering accelerometer data recording, triggering vehicle state sensor data recording, triggering face tracking data recording, or triggering any other appropriate sensor data recording. In some embodiments, the data capture is indicated as being recorded in response to a more confidently drowsy degree detection. In 1310, the driver is warned (e.g., the driver is warned that he is dangerously drowsy). In some embodiments, the driver is warned using a feedback module (e.g., feedback module 204 of FIG. 2). In various embodiments, the driver is warned using a video warning, a light warning (e.g., blinking LED's), an audio warning, a haptic warning (e.g., a warning felt through the steering wheel or the seat), or any other appropriate warning. Control then passes to 1314. In the event drowsy degree detection 1306 determines the driver is less confidently drowsy, control passes to 1312. In 1312, data capture is triggered. In various embodiments, triggering data capture comprises triggering video recording, triggering audio recording, triggering accelerometer data recording, triggering vehicle state sensor data recording, triggering face tracking data recording, or triggering any other appropriate sensor data recording. In some embodiments, the data capture is indicated as being recorded in response to a less confidently drowsy degree detection. Control then passes to 1314. In the event drowsy degree detection 1306 determines the driver is not drowsy, control passes to 1314. In 1314, the process waits. The process waits in order to determine drowsy degree with a limited frequency rather than as fast as possible. In various embodiments, the process waits 100 milliseconds, 500 milliseconds, 1 second, 10 seconds, 1 minute, 10 minutes, or any other appropriate amount of time. Control then passes to 1300 and the process repeats.

Drowsy Driving Detection Scenario: Severe Drowsiness (Driver is Falling Asleep)

Severe cases of drowsiness are detected accurately using a fusion of video and non-video sensor streams:

Extreme blink duration detected on an absolute scale (e.g., microsleep events), or a relative scale (e.g., 4+ standard deviations over a driver-specific baseline);

Extreme head nodding detected on an absolute scale or on a relative scale over a driver-specific baseline;

Extreme lateral vehicle position corrections detected on an absolute scale (e.g., determined by measurements over time on a group of similar vehicles, over a driver-specific baseline, etc. of steering position, or acceleration, of braking, of applying gas, etc.). The most common proxy for lateral vehicle corrections is the standard deviation of lateral acceleration (e.g., if a lateral accelerometer and/or rate gyro is present) or steering corrections (e.g., if a steering signal is available via ECM). Thresholds are calibrated at a level on the order of 3 to 5 standard deviations over the group mean (or alternatively over the driver mean).

Streams are fused using a statistically trained predictive model that estimates the degree of drowsiness. Training data are collected from driving simulators and from historical video evidence captured in vehicles under the range of real-world driving conditions. When severe drowsiness is detected, the system captures video and sensor stream evidence and simultaneously warns the driver to pull over and take a rest break.

Drowsy Driving Detection Scenario: Moderate Drowsiness (Increased Risk of Accident)

Moderate cases of drowsiness are detected with varying levels of accuracy using a fusion of video and non-video sensor streams:

Increased blink duration, mean eye closure, and/or PERCLOS (e.g., percentage of eye closure) detected at 3+ standard deviations above a mean calibrated for a group of drivers or the specific driver;

Increased head nodding at 3 standard deviations over a baseline determined for each specific driver; if no driver history is available, the baseline is determined during the first period of driving (e.g. the first 15 minutes of each trip);

Increased lateral vehicle position corrections over a baseline maintained for each specific driver; if no driver history is available, the baseline is determined during the first period of each trip.

Streams are fused using a statistically trained predictive model that estimates the degree of drowsiness. Training data are collected from driving simulators and from historical video evidence captured in vehicles under the range of real-world driving conditions. When moderate drowsiness is detected, video and sensor stream evidence is captured periodically to allow for offline confirmation of drowsy driving and the capture of additional training data to improve our predictive models.

Drowsy Driving Detection Scenario: Basic Fatigue

Taking into account time of day, duration of current trip, and historical data for a driver or group of drivers, the system suspects fatigue. These prior indicators are fused with the following camera-based and vehicle state sensor streams:

Increased blink duration, mean eye closure, and/or PERCLOS over a baseline such that the short-term mean (e.g., over the last 5 minutes) is at least one standard deviation over the long-time-history mean;

Increased head nodding at least one standard deviation over a baseline calibrated for each driver; if no driver history is available, calibration occurs during the first period of driving;

Increased lateral vehicle position corrections at one standard deviation over a baseline maintained for each specific driver or determined during the first period of driving.

If the driving time also exceeds a separate threshold (e.g., a threshold that is time-of-day dependent), then these indicators may be sufficient to warn the driver of possible fatigue and suggest taking a rest break. Random sampling of video and/or sensor stream data is captured to provide training data to maintain system calibration and improve accuracy.

Figure 13B:
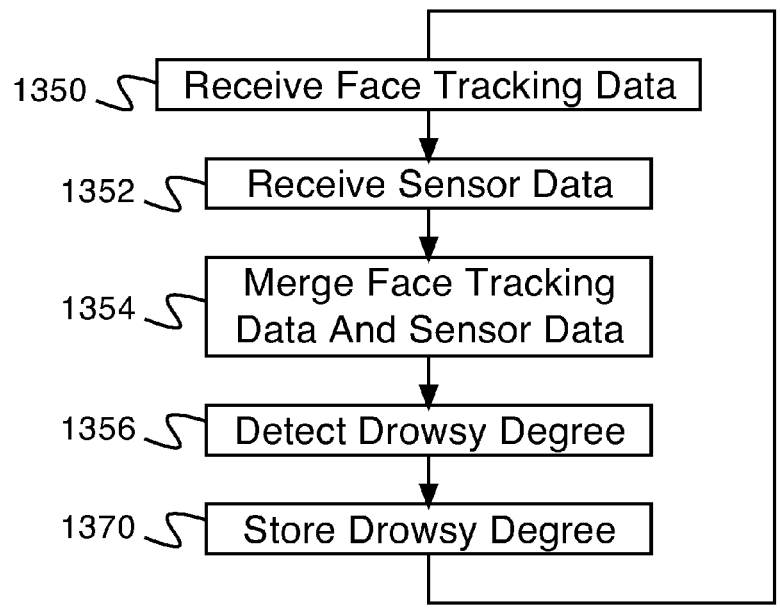
Figure 13B:
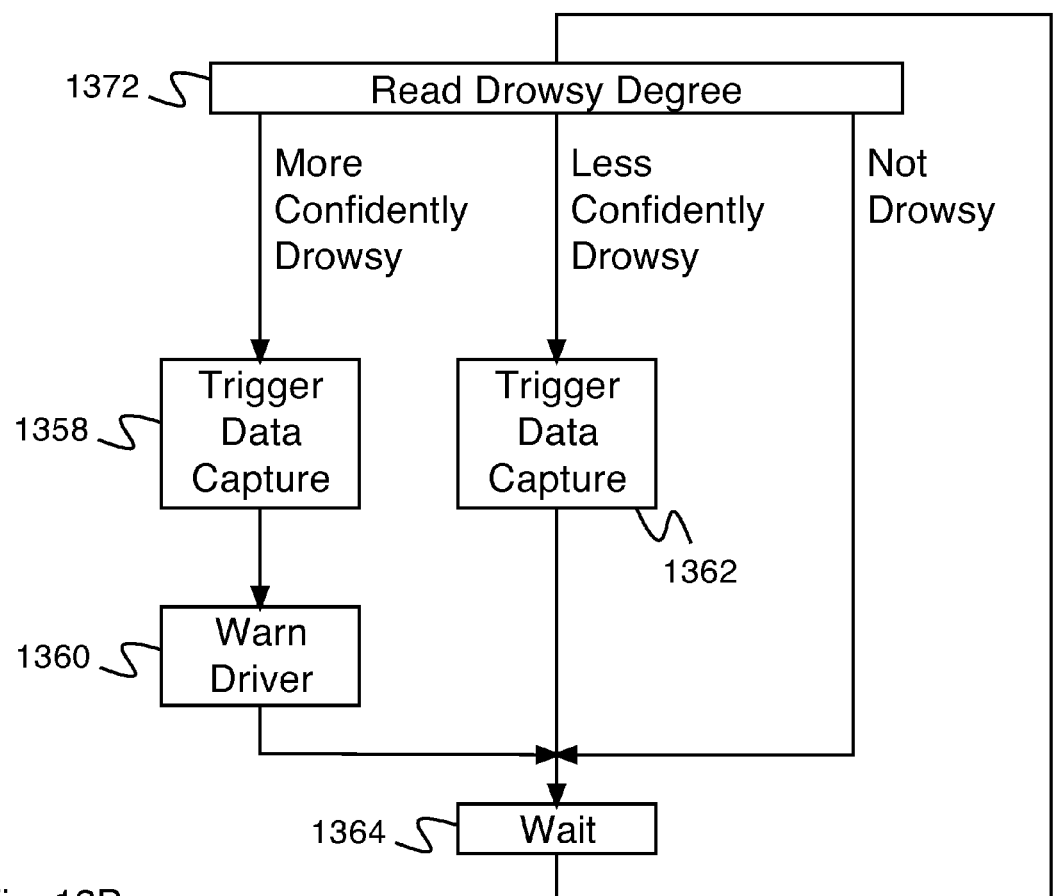

FIG. 13B is a flow diagram illustrating an embodiment of processes for detecting a drowsy driving event. In some embodiments, the process of FIG. 13B is executed by event detection 606 of FIG. 6. In the example shown, the process of FIG. 13B uses separate data calculation and event detection loops. In 1350, face tracking data is received. In 1352, sensor data is received. In 1354, face tracking data and sensor data are merged. In 1356, a drowsy degree is detected. In various embodiments, the drowsy degree detection reports that the driver is drowsy or not drowsy; reports that the driver is more drowsy, less drowsy, or not drowsy; reports that the driver drowsiness on a scale of 1 to 10 (e.g., using the Karolinska sleepiness scale); reports different qualities of driver drowsiness (e.g., eyes closing, more frequent blinking, head nodding, etc.); or reports drowsy degree in any other appropriate way. In 1370, the drowsy degree is stored. In some embodiments, the drowsy degree is stored in a circular buffer. In some embodiments, the series of stored drowsy degree measurements comprises a derived sensor data stream—For example, it can be processed by the event detector like any other sensor data stream. Control then returns to 1350, and the measurement is repeated. In various embodiments, the measurement is repeated 10 times a second, 100 times a second, 1000 times a second, or at any other appropriate rate.

In 1372, the drowsy degree is read (e.g., from the buffer where it was stored in 1370). In the event the drowsy degree read in 1372 indicates the driver is more confidently drowsy, control passes to 1358. In 1358, data capture is triggered. In 1360, the driver is warned. Control then passes to 1364. In the event the drowsy degree read in 1356 indicates the driver is less confidently drowsy, control passes to 1362. In 1362, data capture is triggered. Control then passes to 1364. In the event drowsy degree detection 1306 determines the driver is not drowsy, control passes to 1364. In 1364, the process waits. In various embodiments, the process waits 100 milliseconds, 500 milliseconds, 1 second, 10 seconds, 1 minute, 10 minutes, or any other appropriate amount of time. Control then passes to 1372 and the process repeats. In some embodiments, two separate process loops are used in order to allow for creation of drowsy degree data as fast as possible but process it to determine events at a slower rate.

Figure 14:
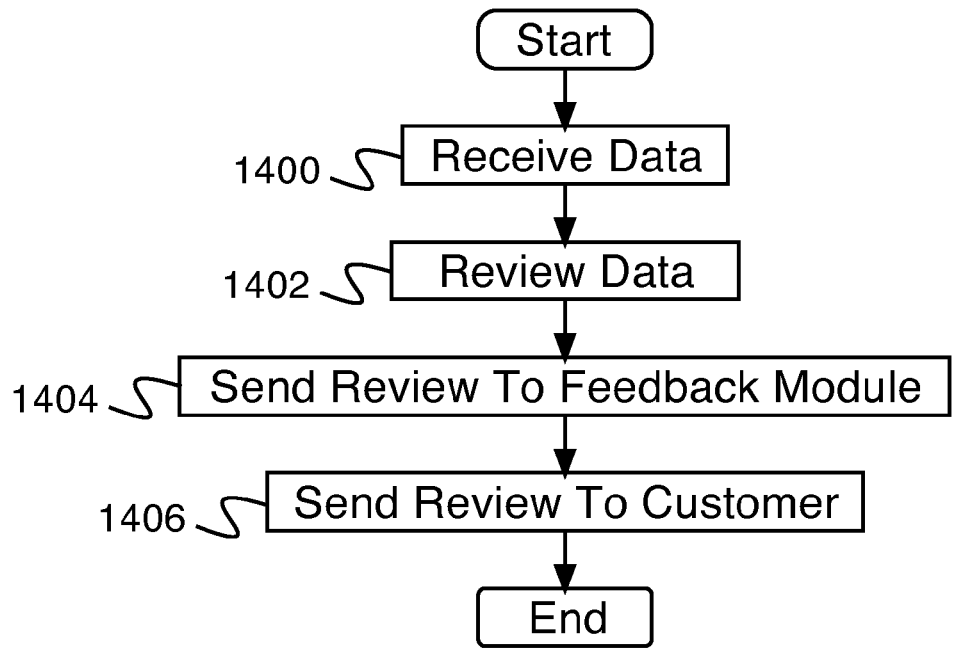
FIG. 14 is a flow diagram illustrating an embodiment of a process for reviewing data.

FIG. 14 is a flow diagram illustrating an embodiment of a process for reviewing data. In some embodiments, the process of FIG. 14 is executed by review module 800 of FIG. 8. In the example shown, in 1400, data is received. For example, data is received in response to a triggered data capture (e.g., triggered data capture 1308 of FIG. 13A or triggered data capture 1312 of FIG. 13A). In 1402, data is reviewed. In some embodiments, data review is performed by human reviewers who examine event data and score the events. In some embodiments, data review is performed by software for automatically processing event data and producing scores. In various embodiments, a data review comprises an indication that an event was triggered correctly, an indication that an event was triggered incorrectly, an indication that an event was triggered partially correctly, an indication that additional events should have been triggered, an indication that no events should have been triggered, an indication of an event severity, a drowsiness score, or any other appropriate data review. In 1404, a review is sent to the feedback module. In 1406, a review is sent to the customer.

Figure 15:
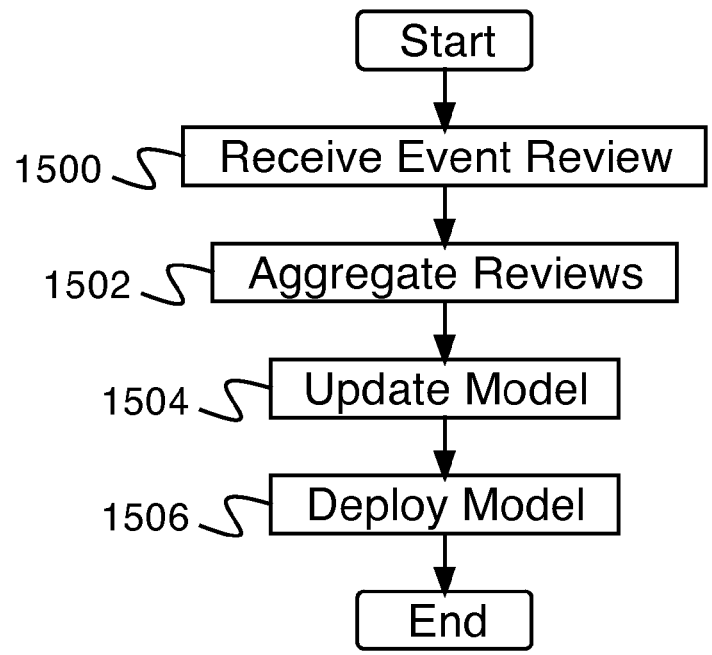
FIG. 15 is a flow diagram illustrating an embodiment of a process for updating a model.

FIG. 15 is a flow diagram illustrating an embodiment of a process for updating a model. In some embodiments, the process of FIG. 15 is executed by feedback module 900 of FIG. 9. In some embodiments, the process of FIG. 15 is used to update a drowsiness detection module (e.g., drowsiness detection module 608 of FIG. 6). In some embodiments, the process of FIG. 15 is used to update a drowsiness detection model (e.g., drowsiness detection model built in 906) of FIG. 9. In the example shown, in 1500, an event review is received. In some embodiments, an event review is received from a review module (e.g., review module 800 of FIG. 8). In 1502, reviews are aggregated. In some embodiments, aggregating reviews comprises collecting reviews. In various embodiments, reviews are collected for a given period of time, until a given number of reviews are collected, until a given number of negative reviews are collected, or for any other appropriate duration. In 1504, the model is updated. In various embodiments, updating the model comprises averaging review data, finding the review data standard deviation, counting the number of reviews indicating incorrect event triggering, training a statistical model, training a neural network, or any other appropriate model updating technique. In some embodiments, updating the model comprises processing other data. In various embodiments, other data processed includes industry type data, road type data, region data, driver data, or any other appropriate data. In 1506, the model is deployed. In some embodiments, the model is automatically deployed. In some embodiments, the model is reviewed before it is deployed.

Figure 16:
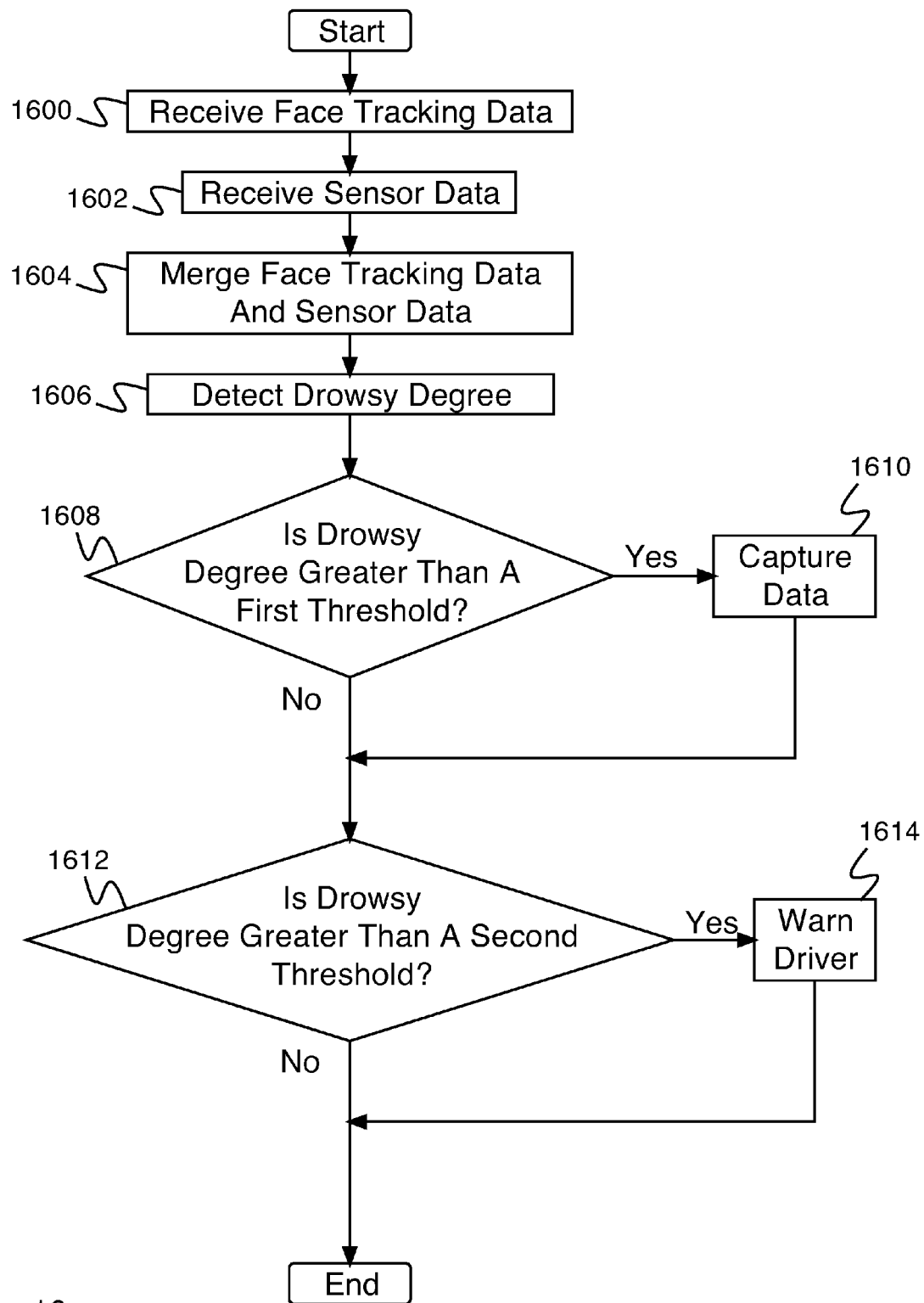
FIG. 16 is a flow diagram illustrating an embodiment of a process for direct observation event triggering of drowsiness.

FIG. 16 is a flow diagram illustrating an embodiment of a process for direct observation event triggering of drowsiness. In some embodiments, the process of FIG. 16 is executed by vehicle event recorder 300 of FIG. 3. In the example shown, in 1600, face tracking data is received. In 1602, sensor data is received. In 1604, face tracking data and sensor data are merged. In 1606, a drowsy degree is determined. For example, the degree of drowsiness is determined based at least in part on face tracking data and sensor data. In some embodiments, the degree of drowsiness is determined using a model (e.g., rule-based model, statistical model, neural network based model, an automatically calibrating anomaly detection model, etc.). In various embodiments, the model is trained using driving simulator data, video data, sensor data, audio data, captured data (e.g., previously stored event data), or any other appropriate data. In various embodiments, face tacking data includes blink duration, blink duration relative to a driver specific baseline (e.g., average, standard deviation, etc.), head nodding, head nodding relative to a driver specific baseline, or any other appropriate face tracking data. In various embodiments, sensor data includes vehicle sensor readings comprising one or more of the following: steering data, acceleration data, braking data, application of gas data, deviations data, jerkiness of responses data, corrections data, overcorrections data, or any other appropriate sensor data. In 1608, it is determined whether the drowsy degree is greater than a first threshold. If it is determined that the drowsy degree is greater than a first threshold, control passes to 1610. In 1610, data is captured. For example, data is captured prior to being triggered by the drowsiness degree, during the trigger by the drowsiness degree, and after the trigger by the drowsiness degree. Control then passes to 1612. If it was determined that the drowsy degree is not greater than a first threshold, control passes to 1612. In 1612, it is determined whether the drowsy degree is greater than a second threshold. If it is determined that the drowsy degree is greater than a second threshold, control passes to 1614. In 1614, the driver is warned. For example, the driver receives an audible warning, an illumination warning, a haptic warning, or any other appropriate warning. In various embodiments, a dispatcher is warned, the system administrator is warned, a supervisor is warned (e.g., using an email, a text message, etc.), or any other appropriate person or entity is warned. The process then ends. If it was determined in 1612 that the drowsy degree is not greater than a second threshold, the process ends.

In some embodiments, the first threshold or the second threshold is dynamically adjusted. In other embodiments, after a model has been developed using both face tracking data and vehicle state sensors. In some embodiments, the model that is developed using both face tracking data and sensor data is distributed to customer vehicles that are equipped only with the non-face-data sensors. In such a case, the model is used to determine drowsy driving behavior. In some embodiments, the model is used to determine real-time driver warnings. In some embodiments, the drowsiness degree is determined by a model that uses only sensor data other than face tracking data to determine a drowsiness degree.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for event triggering, comprising:
   an interface configured to:
      receive a face tracking data for a driver of a vehicle;
      receive a sensor data for the vehicle; and
   a processor configured to:
      evaluate a function of the face tracking data and the sensor data;
      determine a degree of drowsiness for the driver of the vehicle based at least in part on a result of the function of the face tracking data and the sensor data;
      in the event that the degree of drowsiness is greater than a first threshold,
         capture data pertaining to the driver or the vehicle; and
      in the event that the degree of drowsiness is greater than a second threshold,
         provide a warning.

2. A system as in claim 1, wherein the degree of drowsiness is determined using a model.

3. A system as in claim 2, wherein the model is one of the following: rule-based model, statistical model, neural network based model, or an automatically calibrating anomaly detection model.

4. A system as in claim 2, wherein the model is trained using one or more of the following: driving simulator data, video data, sensor data, audio data, or captured data.

5. A system as in claim 2, wherein the model is used to determine a drowsy driving behavior using only non-face-data sensors.

6. A system as in claim 2, wherein the model is used to determine a real-time driver warning using only non-face-data sensors.

7. A system as in claim 1, wherein the face tracking data comprises a blink duration.

8. A system as in claim 7, wherein the blink duration is relative to a driver specific blink duration baseline.

9. A system as in claim 8, wherein the driver specific baseline includes an average blink duration and a standard deviation of blink duration.

10. A system as in claim 1, wherein the face tracking data comprises head nodding.

11. A system as in claim 10, wherein the head nodding is relative to a driver specific head nodding baseline.

12. A system as in claim 11, wherein the driver specific baseline includes an average head nodding and a standard deviation of head nodding.

13. A system as in claim 1, wherein the face tracking data is captured using a rear-view mirror mounted unit.

14. A system as in claim 1, wherein sensor data comprises one or more of the following: steering data, acceleration data, braking data, application of gas data, deviations data, jerkiness of responses data, corrections data, or overcorrections data.

15. A system as in claim 1, wherein capturing data comprises capturing data prior to being triggered by the drowsiness degree, during the trigger by the drowsiness degree, and after the trigger by the drowsiness degree.

16. A system as in claim 1, wherein the driver is warned using one or more of the following an audible warning, an illumination warning, or a haptic warning.

17. A system as in claim 1, wherein the processor is further configured to warn one or more of the following: a dispatcher, a system administrator, or a supervisor.

18. A system as in claim 1, wherein the first threshold or the second threshold is dynamically adjusted.

19. A method of event triggering, comprising:
   receiving a face tracking data for a driver of a vehicle;
   receiving a sensor data for the vehicle;
   evaluating, using a processor, a function of the face tracking data and the sensor data;
   determining a degree of drowsiness for the driver of the vehicle based at least in part on a result of the function of the face tracking data and the sensor data; and
   in the event that the degree of drowsiness is greater than a first threshold,
      capturing data pertaining to the driver or the vehicle; and
   in the event that the degree of drowsiness is greater than a second threshold,
      providing a warning.

20. A computer program product for event triggering, the computer program product being embodied in a non-transitory computer readable storage medium and comprising computer instructions for:
- receiving a face tracking data for a driver of a vehicle;
- receiving a sensor data for the vehicle;
- evaluating a function of the face tracking data and the sensor data;
- determining a degree of drowsiness for the driver of the vehicle based at least in part on a result of the function of the face tracking data and the sensor data; and
- in the event that the degree of drowsiness is greater than a first threshold,
  - capturing data pertaining to the driver or the vehicle; and
- in the event that the degree of drowsiness is greater than a second threshold,
  - providing a warning.

* * * * *